(12) United States Patent
Ooba et al.

(10) Patent No.: US 8,912,722 B2
(45) Date of Patent: Dec. 16, 2014

(54) SUB HEADLIGHT UNIT AND SUB HEADLIGHT SYSTEM FOR USE IN VEHICLE THAT LEANS INTO TURNS, AND VEHICLE THAT LEANS INTO TURNS

(71) Applicant: Yamaha Hatsudoki Kabushiki Kaisha, Iwata-shi, Shizuoka (JP)

(72) Inventors: Junichi Ooba, Shizuoka (JP); Takeshi Ikeda, Shizuoka (JP); Yasuhiko Kino, Shizuoka (JP); Makoto Kosugi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 115 days.

(21) Appl. No.: 13/772,607

(22) Filed: Feb. 21, 2013

(65) Prior Publication Data
US 2013/0241413 A1    Sep. 19, 2013

(30) Foreign Application Priority Data

Mar. 19, 2012   (JP) .................................. 2012-062377
May 31, 2012   (JP) .................................. 2012-125264

(51) Int. Cl.
*B60Q 1/18*   (2006.01)
*B60Q 1/00*   (2006.01)
*B60Q 1/12*   (2006.01)
*B62J 6/02*   (2006.01)

(52) U.S. Cl.
CPC ................ *B60Q 1/18* (2013.01); *B60Q 1/0041* (2013.01); *B60Q 1/12* (2013.01); *B62J 6/02* (2013.01); *B60Q 2300/136* (2013.01); *B62K 2207/02* (2013.01)
USPC ................ 315/82; 362/37; 362/465; 362/464

(58) Field of Classification Search
CPC ........................................................ B60Q 1/18
USPC ........................................ 315/82; 362/41, 464
See application file for complete search history.

(56) References Cited

U.S. PATENT DOCUMENTS 2,516,052 A  *  7/1950  Gray Farr ..................... 362/529
5,426,571 A        6/1995  Jones (Continued)

FOREIGN PATENT DOCUMENTS

EP            1 645 466 A1    4/2006
JP          2008-001305 A    1/2008

(Continued)

OTHER PUBLICATIONS

Official Communication issued in corresponding European Patent Application No. 13159695.9, mailed on Nov. 26, 2013.

(Continued)

*Primary Examiner* — Douglas W Owens
*Assistant Examiner* — Srinivas Sathiraju
(74) *Attorney, Agent, or Firm* — Keating & Bennett, LLP

(57) ABSTRACT

A sub headlight unit for use in a vehicle that leans into turns includes a plurality of sub headlight light sources that illuminate, at one side with respect to a width direction of the vehicle, an area ahead and outward of the vehicle with respect to the width direction of the vehicle. The brightness of the sub headlight light source changes in accordance with a lean angle of the vehicle. When the lean angle of the vehicle reaches a reference value that is individually set for each of the sub headlight light sources, the sub headlight light source exhibits a predetermined brightness. As the reference value set for the sub headlight light source is greater, an outer edge of an illumination range of the sub headlight light source having a predetermined illuminance is located increasingly farther outward with respect to the width direction of the vehicle in a plan view.

18 Claims, 17 Drawing Sheets

(56) References Cited

U.S. PATENT DOCUMENTS

| | | | |
|---|---|---|---|
| 7,477,976 B2 * | 1/2009 | Horii et al. | 701/49 |
| 7,860,627 B2 * | 12/2010 | Horii et al. | 701/49 |
| 7,988,226 B2 * | 8/2011 | Hirukawa | 296/198 |
| 7,988,345 B2 * | 8/2011 | Rosenhahn et al. | 362/538 |
| 8,251,560 B2 * | 8/2012 | Ohno et al. | 362/545 |
| 2010/0213872 A1 | 8/2010 | Heider et al. | |
| 2013/0241412 A1 * | 9/2013 | Ooba et al. | 315/82 |
| 2013/0241413 A1 * | 9/2013 | Ooba et al. | 315/82 |
| 2013/0241414 A1 * | 9/2013 | Ikeda et al. | 315/82 |

FOREIGN PATENT DOCUMENTS

| | | | |
|---|---|---|---|
| JP | 2009-120057 A | 6/2009 | |
| JP | 2010-018120 A | 1/2010 | |
| JP | 4806550 B2 | 11/2011 | |
| JP | 4864562 B2 | 2/2012 | |
| WO | 2010/061651 A1 | 6/2010 | |

OTHER PUBLICATIONS

Ooba et al., "Sub Headlight Unit and Sub Headlight System for Use in Vehicle That Leans Into Turns, and Vehicle That Leans Into Turns", U.S. Appl. No. 13/772,598, filed Feb. 21, 2013.

Ikeda et al., "Sub Headlight Unit and Sub Headlight System for Use in Vehicle That Leans Into Turns, and Vehicle That Leans Into Turns", U.S. Appl. No. 13/772,618, filed Feb. 21, 2013.

"BMW Motorrad adaptiver Scheinwerfer", URL: http://www.youtube.com/watch?v=ErPRzhFxJpc, Jul. 2, 2010.

* cited by examiner

SUB HEADLIGHT UNIT AND SUB HEADLIGHT SYSTEM FOR USE IN VEHICLE THAT LEANS INTO TURNS, AND VEHICLE THAT LEANS INTO TURNS

BACKGROUND OF THE INVENTION

1. Field of the Invention

The present invention relates to a sub headlight unit and a sub headlight system for use in a vehicle that leans into turns, and a vehicle that leans into turns.

2. Description of the Related Art

In general, in a vehicle that leans into turns (such as saddle-ride type vehicles including motorcycles, three-wheeled motor vehicles, snowmobiles, and ATVs (all terrain vehicles), for example), when the vehicle corners or turns at an intersection, a rider operates a handlebar and additionally shifts his/her own weight in order to counteract centrifugal force acting on a vehicle body. As a result, the vehicle turns with an attitude (hereinafter, also referred to as "lean attitude") leaning to the inner side of a curve. On the other hand, in a vehicle that does not lean into turns, for example, in an automobile, when the vehicle corners or turns at an intersection, a rider operates a steering wheel and turns with centrifugal force acting on a vehicle body. Therefore, in the vehicle that does not lean into turns, the vehicle body leans to the outer side of a curve due to the centrifugal force.

In the vehicle that leans into turns, the turning is made with an active use of the weight shifting of the rider himself/herself. Therefore, the vehicle body largely leans. In the vehicle that does not lean into turns, the vehicle body leans to the outer side of the curve due to the centrifugal force. The degree of this leaning varies depending on the running speed of the vehicle and the magnitude (radius) of the curve, and this leaning of the vehicle body is not utilized for the turning. In the vehicle that does not lean into turns, it is preferable that the amount of leaning to the outer side of the curve due to the centrifugal force is small.

Thus, at a time of cornering or turning at an intersection, the vehicle that leans into turns causes the vehicle body to lean to the inner side of the curve with a relatively large amount of leaning, while the vehicle that does not lean into turns causes the vehicle body to lean to the outer side of the curve with a relatively small amount of leaning.

Normally, a vehicle is provided with a plurality of lights irrespective of whether or not the vehicle leans into turns. The lights include a light intended mainly to ensure a field of view of a rider of the vehicle and a light intended mainly to allow a surrounding vehicle or the like to recognize the presence of the rider's own vehicle. A headlight is the light intended mainly to ensure the field of view of the rider of the vehicle, and in general, is configured to switch between a high beam (running headlight) and a low beam (passing headlight).

The high beam, which emits light in a horizontal (upward) direction, ensures a field of view at a long distance. Generally, in order to avoid blinding or impairing the vision of a rider of a nearby or oncoming vehicle, the high beam is used in a situation where there is no vehicle or the like existing ahead at night. The low beam, which emits light in a downward direction, is used even in a situation where there is a vehicle or the like existing ahead. Therefore, in a normal case, a vehicle often runs with the low beam turned on.

When the vehicle that leans into turns is running on a straight road, an illumination range of a headlight light source (low beam) spreads evenly to the left and right in an area ahead in an advancing direction and below a horizontal plane including the headlight light source. When the vehicle that leans into turns is running on a road curving to the left, the vehicle runs with the vehicle body inclined to the left. Accordingly, the illumination range of the headlight light source spreads downward to the left. As a result, a nearer position on a running lane is illuminated. Thus, the illumination range in an area inside the curve and ahead in the advancing direction is reduced.

Therefore, a vehicle has been proposed in which, in addition to a main headlight that illuminates an area ahead of the vehicle, a pair of right and left sub headlights that are turned on depending on the magnitude of a lean angle (angle of inclination of a vehicle body to the inner side of a curve relative to an upright state thereof) are provided as the headlight (Japanese Patent No. 4806550). A vehicle has been also proposed in which a mirror placed at the upper side of a headlight light source is rotated in accordance with the magnitude of a lean angle so that an optical axis of the headlight light source is changed. See, for example, the article entitled, "BMW Motorrad adaptiver Scheinwerfer" [online], uploaded on Jul. 2, 2010 [retrieved on Mar. 12, 2012], from Internet (URL: http://www.youtube.com/watch?v=ErPRzhFxJpc), hereinafter referred to as "the BMW article".

A situation under which the vehicle corners or turns at an intersection is not always the same. A rider's field of view at a time of turning a curve varies depending on the vehicle speed and also on the radius of a road, and the like.

For example, even on a road having a curve with the same radius, some vehicles move through the curve at a relatively low speed, and other vehicles move through the curve at a relatively high speed. At this time, the lean angle of the vehicle moving at the high speed is larger than the lean angle of the vehicle moving at the low speed. Accordingly, an illumination range of a headlight of the vehicle moving at the high speed decreases as compared with an illumination range of a headlight of the vehicle moving at the low speed. Therefore, a visible range ahead in a path varies depending on the vehicle speed.

Furthermore, even when the vehicle is running at the same speed, the lean angle is small in a curve with a large radius so that the illumination range is reduced to a small extent, while the lean angle is large in a curve with a small radius so that the illumination range is reduced to a large extent. Accordingly, for example, in a case of continuously moving through a plurality of curves having different radii during touring on a mountain road, the illumination range of the headlight changes in each curve even though the speed does not change so much. As a result, the field of view ahead in a path changes. When such a change in the field of view ahead in a path during a curve is small, a rider is more likely to feel safe.

In the vehicle disclosed in Japanese Patent No. 4806550, the pair of right and left sub headlights are turned on in accordance with the lean angle. Here, in order to prevent blinding or impairing the vision of a rider of a nearby or oncoming vehicle, or the like, it is preferable that, at a time of running on a curve, a light emission direction of the sub headlight is lower than a horizontal plane. Under such restricted circumstances, a problem arises that it is difficult to sufficiently suppress, by means of a pair of right and left sub headlights, a change in the field of view ahead in a path caused by a difference in a situation of moving through a curve.

On the other hand, in the headlight unit of variable optical axis type disclosed in the BMW article, the mirror is rotated in accordance with the magnitude of the lean angle, and thereby the orientation of the optical axis can be continuously changed. Thus, even under the restriction that the light emission direction of the headlight should be lower than the horizontal plane, it is easy to suppress a change in the field of view ahead in a path. Moreover, a change in the optical axis direction of the headlight itself is used to respond to a reduction in the illumination range of the headlight. This achieves a compact size of the headlight unit. Thus, the headlight of variable optical axis type disclosed in the BMW article has a compact size, and is quite useful.

However, as a result of testing, in a wide variety of running scenes, a vehicle including the headlight unit of movable optical axis type disclosed in the BMW article, the following was revealed. That is, in some scenes, it is desirable to illuminate a position still farther from the vehicle on a path. In order to largely change the light emission direction for such a scene, for example, it is necessary to increase the size of a movable member such as the mirror, or to provide another movable member, or to increase the size of a reflector and a bracket in order to ensure a wide movable range of the mirror. This causes a problem that the size of the headlight unit increases, which is not suitable for a vehicle that leans into turns.

SUMMARY OF THE INVENTION

In view of the problems described above, preferred embodiments of the present invention provide a vehicle that leans into turns and a sub headlight unit and a sub headlight system for use in a vehicle that leans into turns, by which illumination ranges suitable for a wide variety of running scenes are obtained while preventing an increase in size.

The present inventors have conducted intensive studies of the problem that the conventional techniques have difficulties in sufficiently suppressing and preventing a change in the field of view ahead in a path caused by a difference in a situation of moving through a curve, and the present inventors have discovered the following.

In a conventional technique such as that described in Japanese Patent No. 4806550, the orientation of the sub headlight is set such that, along with an increase in the lean angle of a vehicle, an illumination range of the sub headlight starts to cover a position that has been out of the illumination range. In other words, in this conventional technique, the orientation of the sub headlight is set based on the correspondence relationship between an increase in the lean angle and a reduction in the illumination range.

It is true that there is a correspondence relationship between an increase in the lean angle and a reduction in the illumination range, but merely setting the orientation of the sub headlight based on this correspondence relationship cannot sufficiently ensure the rider's field of view ahead in a path at a time of moving through a curve.

This is because, at a time of moving through a curve, the position of the line of sight of the rider looking ahead in a path differs depending on the circumstances. For example, even in the same curve, when the vehicle speed is high, the rider seeks to see a position farther ahead in the path. Even though the vehicle speed is the same, when the radius of a curve is small, the rider seeks to see a position farther into the curve. In short, a change in the field of view ahead in the path at a time of moving through a curve is influenced by a change in the rider's line of sight which changes in accordance with a wide variety of running scenes. This point has to be considered, too, in order to suppress a change in the field of view ahead in a path caused by a difference in a situation of moving through a curve. The present inventors have made the above-described discoveries, and developed preferred embodiments of the present invention.

According to a preferred embodiment of the present invention, a sub headlight unit for use in a vehicle that leans into turns includes a plurality of sub headlight light sources that illuminate, at one side with respect to a width direction of the vehicle, an area ahead and outward of the vehicle with respect to the width direction of the vehicle, wherein the brightness of the sub headlight light source changes in accordance with a lean angle of the vehicle, when the lean angle of the vehicle reaches a reference value that is individually set for each of the sub headlight light sources, the sub headlight light source exhibits a predetermined brightness, as the reference value set for the sub headlight light source is greater, an outer edge of an illumination range of the sub headlight light source having a predetermined illuminance is located farther outward with respect to the width direction of the vehicle in a plan view.

As the reference value set for the sub headlight light source is greater, the outer edge of the illumination range of the sub headlight light source having the predetermined illuminance preferably is located farther outward with respect to the width direction of the vehicle in a plan view. Accordingly, as the lean angle of the vehicle is larger, a farther outward position with respect to the width direction of the vehicle is illuminated.

As described above, even in the same curve, the lean angle of the vehicle increases when moving at a high speed, and even at the same speed, the lean angle of the vehicle increases when moving through a curve having a smaller radius. In these situations, the rider seeks to see a position or area farther ahead in a path or a position farther into a curve. As the lean angle of the vehicle is larger, a farther outward position with respect to the width direction of the vehicle is illuminated. Therefore, such a change in the rider's line of sight can be responded to. This enables illumination to be performed with an illumination range suitable for each of a wide variety of running scenes.

Additionally, illumination with illumination ranges suitable for a wide variety of running scenes is achieved by using the plurality of sub headlight light sources. Therefore, any mechanism and any member that moves the optical axis of the sub headlight light source are not required. Accordingly, there is no necessity to increase the size of the sub headlight in order to outwardly widen a range that the sub headlight can illuminate, and it is relatively easy to outwardly widen the illumination range.

As the reference value set for the sub headlight light source is greater, an outer edge of an illumination range of the sub headlight light source having a predetermined illuminance obtained when the vehicle is in an upright state preferably is located farther outward with respect to the width direction of the vehicle.

With this configuration, in accordance with the lean angle of the vehicle, an even farther outward position with respect to the width direction of the vehicle is illuminated. This enables illumination to be performed with an illumination range more suitable for each of a wide variety of running scenes.

As the reference value set for the sub headlight light source is greater, a larger angle preferably is formed in a plan view between an optical axis of the sub headlight light source and a center line of the vehicle in a front-back direction thereof.

Accordingly, when the lean angle increases, the sub headlight light source whose optical axis is directed farther outward is brightened. This enables illumination to be performed with an illumination range more suitable for each of a wide variety of running scenes.

The center line of the vehicle in the front-back direction is a straight line that extends in the front-back direction of the vehicle while moving through the center of the vehicle with respect to the width direction of the vehicle on a horizontal plane located at the same level as a main headlight light source (low beam light source) of the vehicle. Accordingly, when the vehicle is shifted from the upright state into the leaning state, the center line is shifted laterally with respect to the width direction of the vehicle. The angle formed between the optical axis of the sub headlight light source and the center line is an angle formed therebetween, in a plan view, at a time when the sub headlight light source exhibits the predetermined brightness as a result of the sub headlight light source reaching the reference value.

The plurality of sub headlight light sources preferably are located at the one side of the vehicle with respect to the width direction of the vehicle, as the reference value set for the sub headlight light source is greater, an outer edge of an illumination range having a predetermined illuminance generated at the one side by the sub headlight light source among the plurality of sub headlight light sources preferably is located farther outward with respect to the width direction of the vehicle.

In this configuration, the illumination is provided by the plurality of sub headlight light sources that are provided at one side of the vehicle with respect to the width direction of the vehicle toward a direction ahead of and lateral to the vehicle at the one side. Therefore, the distance from the light source to an illumination target is shortened. This enables illumination to be more effectively performed with an illumination range suitable for each of a wide variety of running scenes.

Also, in this configuration, for example, when the vehicle turns to the left, the sub headlight light sources provided at the left side of the vehicle with respect to the width direction of the vehicle illuminate an area ahead and at the left side of the vehicle. Therefore, all of a turning direction, the position of the light source that is turned on, and an illuminating direction are at the left side with respect to the width direction of the vehicle. When, in this manner, the turning direction, the position of the light source that is turned on, and the illuminating direction are coincident with respect to the width direction of the vehicle, an uncomfortable feeling is not given to, for example, a rider of an oncoming vehicle.

As the reference value set for the sub headlight light source is greater, an illumination range of the sub headlight light source obtained when the vehicle is in an upright state preferably is located increasingly upwardly, as the illumination range of the sub headlight light source is located more upwardly, an outer edge of an illumination range having a predetermined illuminance generated by the sub headlight light source among the plurality of sub headlight light sources is located farther outward with respect to the width direction of the vehicle.

In this configuration, the brightnesses of the plurality of sub headlight light sources are sequentially changed in accordance with an increase in the lean angle. As a result, the illumination range is widened upward and outward. This enables illumination to be performed with an illumination range suitable for each of a wide variety of running scenes, and at the same time enables illumination to be efficiently performed in accordance with an increase in the lean angle.

An optical axis of the sub headlight light source is fixed, as the reference value set for the sub headlight light source is greater, an outer edge of an illumination range having a predetermined illuminance generated by the sub headlight light source among the plurality of sub headlight light sources whose optical axes are fixed is located farther outward with respect to the width direction of the vehicle.

In this configuration, the optical axes of the plurality of sub headlight light sources are fixed. Therefore, any movable mechanism and any movable member that moves the optical axes of the sub headlight light sources are not provided. Accordingly, there is no necessity to increase the sizes of a movable mechanism and a movable member in order to outwardly widen a range that the illumination can reach. Thus, a size increase is prevented.

As the reference value set for the sub headlight light source is greater, a cut-off line of the sub headlight light source, obtained when the vehicle in an upright state is seen from the front side of the vehicle, preferably is inclined at a larger inclination angle.

In this configuration, when the brightness of the sub headlight light source increases along with an increase in the lean angle, the cut-off line of the sub headlight light source is prevented from being above the horizon. This enables illumination to be efficiently performed with an illumination range suitable for each of a wide variety of running scenes, while preventing glare.

When the lean angle of the vehicle reaches a reference value that is individually set for each of the sub headlight light sources, the sub headlight light source is turned on, as the reference value set for the sub headlight light source is greater, an outer edge of an illumination range having a predetermined illuminance generated by the sub headlight light source at a time when the sub headlight light source is turned on is located farther outward with respect to the width direction of the vehicle.

In this configuration, upon reaching the reference value, the sub headlight is turned on so that the illumination range of the sub headlight covers an area where the rider's line of sight is directed. This enables illumination to be effectively performed with an illumination range suitable for each of a wide variety of running scenes.

When the lean angle of the vehicle reaches a reference value that is individually set for each of the sub headlight light sources, the sub headlight light source is turned on in a full light state, as the reference value set for the sub headlight light source is greater, an outer edge of an illumination range having a predetermined illuminance generated by the sub headlight light source at a time when the sub headlight light source is turned on in the full light state is located farther outward with respect to the width direction of the vehicle.

In this configuration, upon reaching the reference value, the sub headlight is turned on in the full light state so that the illumination range of the sub headlight covers and brightens an area where the rider's line of sight is directed. This enables illumination to be more effectively performed with an illumination range suitable for each of a wide variety of running scenes.

The sub headlight units are preferably provided at the one side of the vehicle, when the vehicle is in an upright state, and the sub headlight light source having a greater reference value is preferably located at the outer side of the sub headlight light source having a smaller reference value with respect to the width direction of the vehicle.

When the vehicle moves through a curve, the rider is more likely to see a position farther into the curve (farther outward with respect to the width direction of the vehicle) in accordance with an increase in the lean angle of the vehicle. In a preferred embodiment of the present invention, as the lean angle increases, the sub headlight light source located farther outward is turned on. This makes it easy to ensure a wide illumination range in an area lateral to the vehicle such that a position that the rider desires to see is much more likely to be illuminated. Moreover, the turn-on of the sub headlight light sources in accordance with an increase in the lean angle is performed preferably in the order from the inner sub headlight light source to the outer sub headlight light source, and the outer edges of the illumination ranges of the sub headlights are arranged from the inner side to the outer side as the lean angle increases. In this manner, both the order of turn-on in accordance with an increase in the lean angle and the order of arrangement of the outer edges of the illumination ranges in accordance with an increase in the lean angle are from the inner side to the outer side. Thus, these orders are coincident with each other. This enables placement of the sub headlight light sources and setting of light distributions of the sub headlight light sources to be readily implemented. Therefore, it is easy to ensure a relatively wide illumination range as the illumination range of each of the sub headlight light sources that emit light in different directions.

When the vehicle is in an upright state, the sub headlight light source having a greater reference value preferably is located higher than the sub headlight light source having a smaller reference value.

The sub headlight light sources preferably are located such that the heights thereof are lowered in accordance with an increase in the lean angle. Accordingly, as for the extent of vertical movement of the sub headlight light source from when the vehicle is in the upright state to when the sub headlight light source reaches the reference value, the extent of movement of the sub headlight light source having a greater reference value is larger than the extent of movement of the sub headlight light source having a smaller reference value.

In this configuration, by placing the sub headlight light source having a greater reference value in a higher position, a difference in the height among the sub headlight light sources at times when they are turned on is made small. As a result, a difference among the illumination ranges generated on a road surface at times when the sub headlight light sources are turned on is made small. Therefore, when seen from the rider's viewpoint, a difference among shadows, which are produced when an obstacle (such as unevenness on the road surface) exists, is made small. This can perform illumination more suitable for each of a wide variety of running scenes.

When the vehicle is in an upright state, the sub headlight light source having a greater reference value preferably is located lower than the sub headlight light source having a smaller reference value.

The frequency of reaching the predetermined brightness is higher in the sub headlight light source having a smaller reference value than in the sub headlight light source having a greater reference value. In this configuration, the sub headlight light source having a smaller reference value is located at a relatively high position at a time when this sub headlight light source is turned on. Thus, a relatively wide illumination range is ensured as the illumination range of the sub headlight light source having a smaller reference value. Additionally, since the sub headlight light source is turned on at a relatively high position, it is easy to set an illumination range on the road surface. It is also easy for the rider to visually recognize an obstacle (such as unevenness on the road surface) and an area behind the obstacle. This enables the sub headlight light sources to achieve illumination more suitable for a wide variety of running scenes.

The plurality of sub headlight light sources are preferably arranged near or adjacent to one another, and when the vehicle is in an upright state, the positions of the sub headlight light sources neighboring one another are partially coincident with respect to a height direction.

In this configuration, a difference in the height among the sub headlight light sources at times when they are turned on is made further smaller. This can more effectively prevent an occurrence of a situation where the rider feels uncomfortable due to a change, which depends on a running scene, in the illumination range of the sub headlight light source within the rider's field of view at a time when the sub headlight light source is turned on. This enables the sub headlight light sources to achieve illumination that is more suitable for a wide variety of running scenes.

When the vehicle is in an upright state, the plurality of sub headlight light sources are preferably arranged in a horizontal direction.

In this configuration, a difference in the height among the sub headlight light sources at times when they are turned on is made further smaller. This can more effectively prevent an occurrence of a situation where the rider feels uncomfortable due to a change, which depends on a running scene, in the illumination range of the sub headlight light source within the rider's field of view at a time when the sub headlight light source is turned on. This enables the sub headlight light sources to achieve illumination that is more suitable for a wide variety of running scenes.

A front cover is preferably included in the vehicle and has a curved surface that is outwardly convex and extends from a front center portion with respect to the width direction of the vehicle in a direction rearward and outward with respect to the width direction of the vehicle. The plurality of sub headlight light sources are preferably arranged along the curved surface of the front cover.

This configuration enables placement of the sub headlight light sources and setting of light distributions of the sub headlight light sources to be readily implemented. Thus, it is easy to ensure a relatively wide illumination range as the illumination range of each of the sub headlight light sources that emit light in different directions.

When the vehicle is in an upright state, the outermost sub headlight light source located preferably is located above a main headlight provided in the vehicle, the main headlight being configured to illuminate an area ahead in front of the vehicle.

In this configuration, the sub headlight light source that is turned on when the lean angle is larger is located at a high position. Accordingly, illumination can be made from a high position. This can delay a timing of approaching of the cut-off line from the side of the vehicle in accordance with an increase in the lean angle after the sub headlight light source is turned on. Additionally, this can prevent or minimize a reduction in the illumination range, which occurs in accordance with an increase in the lean angle. Moreover, illumination from a high position enables setting of the illumination range to be readily implemented. Furthermore, illumination from a high position makes an obstacle (such as unevenness on the road surface) and an area behind the obstacle easily viewable to the rider.

According to another preferred embodiment of the present invention, a sub headlight system for use in a vehicle that leans into turns includes the sub headlight unit according to any one of the preferred embodiments of the present invention described above; a controller that changes the brightnesses of the plurality of sub headlight light sources in accordance with the lean angle of the vehicle; and a detector that detects a variable available to obtain the lean angle of the vehicle, wherein, when the lean angle of the vehicle reaches a reference value that is individually set for each of the sub headlight light sources, the controller causes the corresponding sub headlight light source to exhibit a predetermined brightness.

In this configuration, an AFS (Adaptive Front-Lighting System) is achieved that can perform illumination with illumination ranges suitable for a wide variety of running scenes while preventing an increase in size.

According to another preferred embodiment of the present invention, a vehicle that leans into turns includes the sub headlight system described above.

In this configuration, illumination with illumination ranges suitable for a wide variety of running scenes are achieved while preventing an increase in size.

In various preferred embodiments of the present invention, the optical axis is a straight line that moves through a light source and the center of a maximum illuminance portion of emitted light. The center of the maximum illuminance portion of the emitted light can be identified by emitting light from a light source to a screen that is placed ahead of the light source. This screen illuminance test can be implemented by a method specified in JIS D1619. Also, the cut-off line and the illumination range having the predetermined illuminance can be identified based on a result (such as an isolux distribution map) of the screen illuminance test mentioned above. The cut-off line and the illumination range having the predetermined illuminance in a plan view can be identified based on a road-surface light distribution that is obtained by converting the result of the screen illuminance test mentioned above into the road-surface light distribution. The conversion into the road-surface light distribution can be implemented by a conventionally known method. To be specific, through commonly-used drawing and geometric calculation, conversion from a screen illuminance value into a road-surface illuminance value can be performed. In such a case, the following expression (I) is usable. In the following expression (I), D represents a light source, E represents a point on a road surface, and F represents a point of intersection at which the screen placed between D and E intersects with a straight line connecting D to E.

$$\text{Road-surface illuminance}(Lx) = \text{Screen Illuminance}(Lx) \times [(\text{Distance between } D \text{ and } F(m))/(\text{Distance between } D \text{ and } E(m))]^2 \quad (I)$$

In various preferred embodiments of the present invention, illumination with illumination ranges suitable for a wide variety of running scenes are achieved without any size increase.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
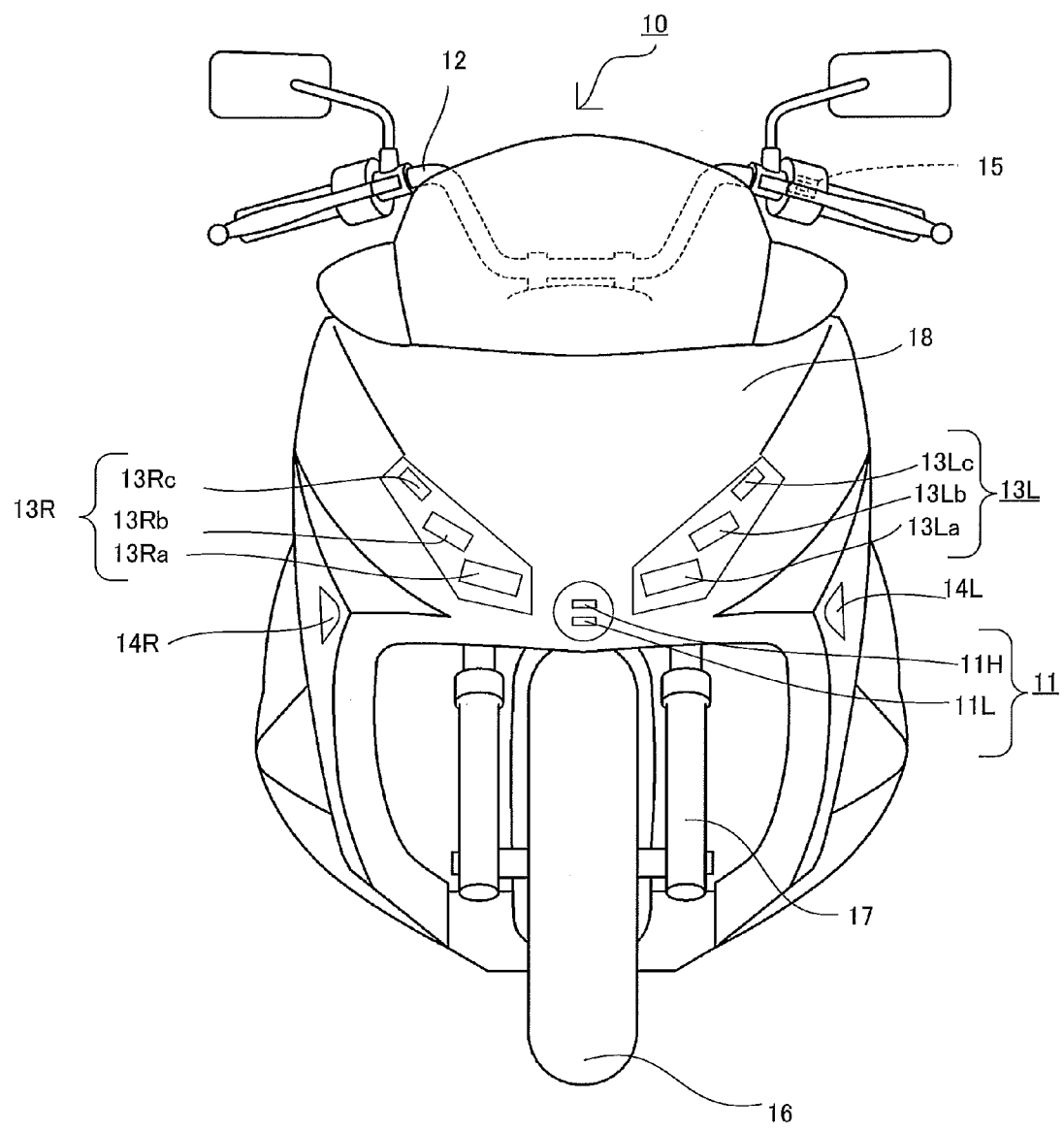
FIG. 1 is a front elevational view schematically showing a motorcycle according to a preferred embodiment of the present invention.

FIG. 1 is a front elevational view schematically showing a motorcycle according to a preferred embodiment of the present invention.

A motorcycle 10 is a non-limiting example of a vehicle that leans into turns according to a preferred embodiment of the present invention. In the present invention, no particular limitation is put on the vehicle that leans into turns. For example, saddle-ride type vehicles including motorcycles, three-wheeled motor vehicles, snowmobiles, and ATVs (all terrain vehicles) may be provided as a preferred embodiment of the present invention. In the following description, the terms "front" and "back" are terms with respect to an advancing direction of the vehicle, the terms "up" and "down" are terms with respect to the vertical direction of the vehicle, and the terms "right" and "left" are terms with respect to a rider.

The motorcycle 10 includes a handlebar 12. An operation switch 15 is provided in a left portion of the handlebar 12 with respect to a width direction of the vehicle. The operation switch 15 includes a beam switch 15B and a flasher switch 15F (see FIG. 2). A steering shaft (not shown) is fixed to a center portion of the handlebar 12 with respect to the width direction of the vehicle. The steering shaft extends downward through a headpipe (not shown). A frontfork 17 is provided at a lower end of the steering shaft. A front wheel 16 is rotatably supported at the lower end of the frontfork 17. The headpipe is a member constituting a vehicle body frame. In the present invention, no particular limitation is put on the vehicle body frame, and a conventional known configuration is adoptable.

A front cover 18 covers a front portion of the headpipe having the steering shaft moving therethrough. On a front surface of the front cover 18, a main headlight 11 is provided in a center portion with respect to the width direction of the vehicle. The main headlight 11 includes a high beam light source 11H (running headlight) and a low beam light source 11L (passing headlight). The high beam light source 11H illuminates an area ahead of the motorcycle 10 at a height equal to or above a horizontal plane of the main headlight 11. The low beam light source 11L illuminates an area ahead of the motorcycle 10 at a height below the horizontal plane of the main headlight 11.

The high beam light source 11H and the low beam light source 11L are configured such that only one of them preferably is turned on at one time, for example. The rider operates the beam switch 15B (see FIG. 2) to switch turn-on of the high beam light source 11H and turn-on of the low beam light source 11L.

The motorcycle 10 includes a sub headlight 13. The sub headlight 13 includes two sub headlight units 13L and 13R of variable light distribution type. Each of the sub headlight units 13L and 13R is provided at each side with respect to the width direction of the vehicle. The sub headlight unit 13L includes a plurality of sub headlight light sources 13La, 13Lb, and 13Lc. The sub headlight light sources 13La, 13Lb, and 13Lc are arranged in this order from the center toward the upper left with respect to the width direction of the vehicle. Illumination ranges of the sub headlight light sources 13La, 13Lb, and 13Lc are arranged in this order from the center toward the upper left with respect to the width direction of the vehicle. The illumination ranges of the sub headlight light sources 13La, 13Lb, and 13Lc overlap one another. The sub headlight unit 13R includes a plurality of sub headlight light sources 13Ra, 13Rb, and 13Rc. The sub headlight light sources 13Ra, 13Rb, and 13Rc are arranged in this order from the center toward the upper right with respect to the width direction of the vehicle. Illumination ranges of the sub headlight light sources 13Ra, 13Rb, and 13Rc are arranged in this order from the center toward the upper right with respect to the width direction of the vehicle. The illumination ranges of the sub headlight light sources 13Ra, 13Rb, and 13Rc overlap one another.

The sub headlight unit 13L is arranged at the left side of the motorcycle 10 with respect to the width direction of the vehicle. The plurality of sub headlight light sources 13La to 13Lc included in the sub headlight unit 13L illuminate the side (left side) where the sub headlight unit 13L is arranged with respect to the width direction of the vehicle. Different reference values are set for the sub headlight light sources 13La to 13Lc, as will be described later. When a lean angle of the motorcycle 10 leaning to the side (for example, left side) where the sub headlight unit 13L is arranged reaches a reference value, the sub headlight light source for which this reference value is set is turned on. The reference value increases in the order of the reference value set for the sub headlight light source 13La, the reference value set for the sub headlight light source 13Lb, and the reference value set for the sub headlight light source 13Lc.

As shown in FIG. 1, when the motorcycle 10 is in an upright state, the sub headlight light sources 13La, 13Lb, and 13Lc are arranged in this order from the inside to the outside (left side) with respect to the width direction of the vehicle. That is, the sub headlight light source having a greater reference value is located farther outward (left side) with respect to the width direction of the vehicle than the sub headlight light source having a smaller reference value.

Additionally, when the motorcycle 10 is in the upright state, the sub headlight light sources 13La, 13Lb, and 13Lc are arranged in this order from the lower side to the upper side. That is, the sub headlight light source having a greater reference value is located higher than the sub headlight light source having a smaller reference value.

The front cover 18 includes a curved surface that is outwardly convex and extends from a front center portion with respect to the width direction of the vehicle in a direction rearward and outward with respect to the width direction of the vehicle. The plurality of sub headlight light sources 13La to 13Lc are arranged along the curved surface of the front cover 18. That is, an optical axis of the sub headlight light source located outward with respect to the width direction of the vehicle is oriented more outward with respect to the width direction of the vehicle than an optical axis of the sub headlight light source located inward with respect to the width direction of the vehicle.

Furthermore, the sub headlight light source 13Lc that is located outermost when the motorcycle 10 is in the upright state is positioned above the main headlight 11 (the high beam light source 11H and the low beam light source 11L).

Except for whether the sub headlight unit is provided at the right side or the left side of the symmetry, the sub headlight unit 13R preferably is identical to the sub headlight unit 13L. Therefore, a description thereof will be omitted.

The optical axes of the sub headlight light sources 13La to 13Lc and 13Ra to 13Rc are fixed, and not moved in accordance with the lean angle. A reflector (not shown) of the sub headlight light source is also fixed, and not moved in accordance with the lean angle. In this preferred embodiment, no particular limitation is put on the sub headlight light source. For example, an LED is adoptable as the sub headlight light source. A mono-focus type light source is also adoptable as the sub headlight light source. As for how the sub headlight light sources 13La to 13Lc and 13Ra to 13Rc are arranged in the motorcycle 10, the above-described arrangement manner is merely an illustrative example of a preferred embodiment of the present invention. The present invention is not limited to this example.

Flashers 14L and 14R, serving as direction indicators, are provided at both sides of the motorcycle 10 with respect to the width direction of the vehicle. The flashers 14L and 14R are configured such that only one of them preferably flashes at one time, except for when a hazard light mode is activated. The rider operates the flasher switch 15F (see FIG. 2), and thereby flashing/turn-off of the flashers 14L and 14R is switched.

The plurality of sub headlight light sources 13La, 13Lb, and 13Lc, which are positioned at the left side in the motorcycle 10 with respect to the width direction of the vehicle, are arranged between the main headlight 11 and the flasher 14L. The plurality of sub headlight light sources 13Ra, 13Rb, and 13Rc, which are positioned at the right side in the motorcycle 10, are arranged between the main headlight 11 and the flasher 14R. In the present invention, no particular limitation is put on the positional relationship between the sub headlight light source and the flasher with respect to the width direction of the vehicle. For example, it may be acceptable that the sub headlight light source is provided outside the flasher with respect to the width direction of the vehicle.

The plurality of sub headlight light sources 13La, 13Lb, and 13Lc are preferably provided above the main headlight 11 and the flasher 14L. The plurality of sub headlight light sources 13Ra, 13Rb, and 13Rc are preferably provided above the main headlight 11 and the flasher 14R.

The plurality of sub headlight light sources 13La to 13Lc, which are provided to the left with respect to the width direction of the vehicle, illuminate an area ahead and at the left side of the motorcycle 10. The plurality of sub headlight light sources 13Ra to 13Rc, which are provided to the right with respect to the width direction of the vehicle, illuminate an area ahead and at the right side of the motorcycle 10.

Figure 2:
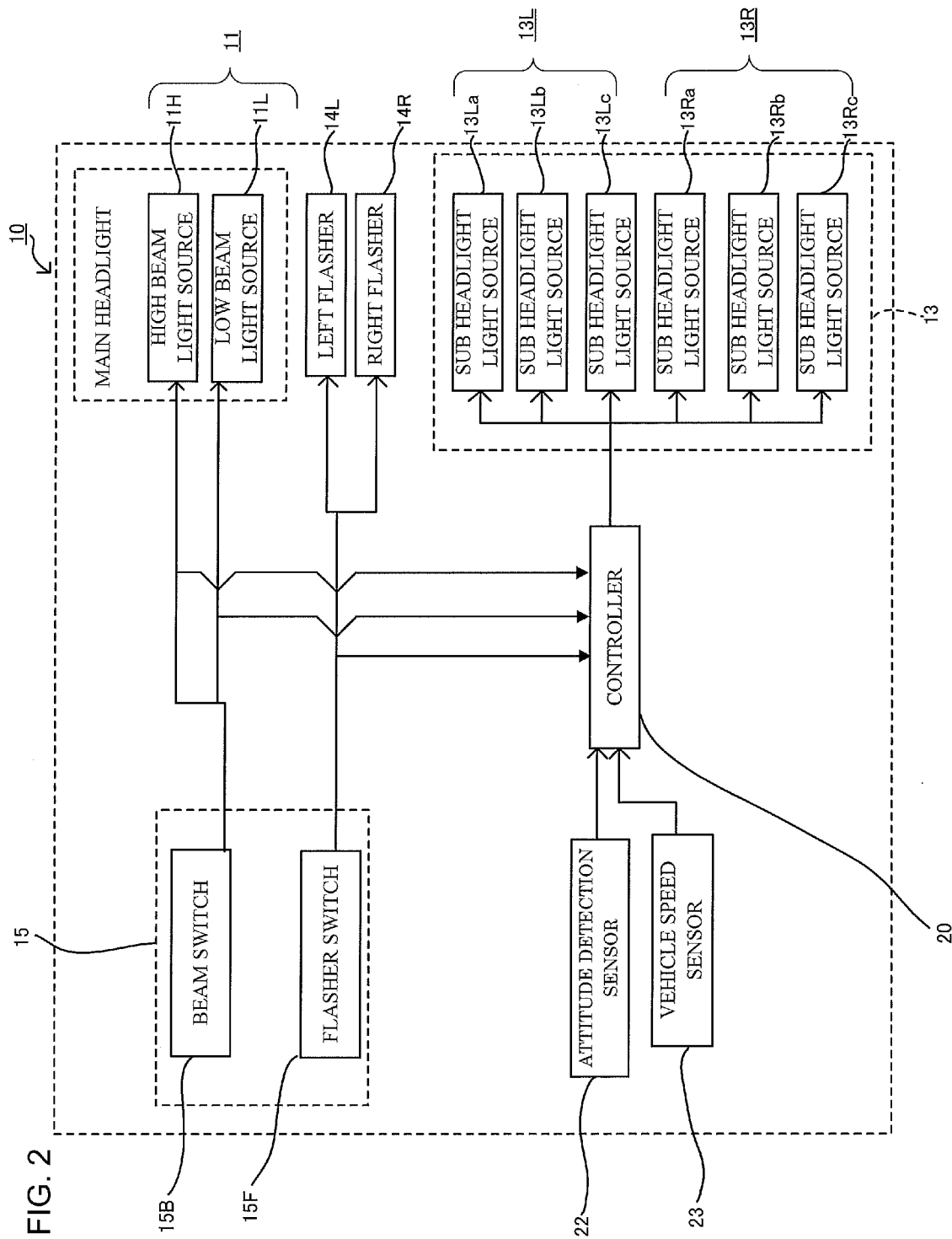
FIG. 2 is a block diagram showing a basic configuration concerning sub headlight light sources of the motorcycle shown in FIG. 1.

FIG. 2 is a block diagram showing a basic configuration concerning the sub headlight light sources of the motorcycle shown in FIG. 1.

The operation switch 15 includes the beam switch 15B and the flasher switch 15F. The beam switch 15B is connected to the high beam light source 11H and the low beam light source 11L included in the main headlight 11. When the rider operates the beam switch 15B, turn-on/turn-off of the high beam light source 11H and the low beam light source 11L is switched in accordance with the operation performed on the beam switch 15B.

The flasher switch 15F is connected to the flashers 14L and 14R. When the rider operates the flasher switch 15F, one of the flashers 14L and 14R is caused to flash in accordance with the operation performed on the flasher switch 15F. In the motorcycle 10, an attitude detection sensor 22 and a vehicle speed sensor 23 are preferably provided. In this preferred embodiment, the attitude detection sensor 22 preferably is a gyro sensor that detects the angular velocity about an axis in the front-back direction of the motorcycle 10. The attitude detection sensor 22 supplies, to a controller 20, a signal indicating the detected angular velocity (roll rate) about the axis in the front-back direction. The vehicle speed sensor 23 detects the vehicle speed, and supplies, to the controller 20, a signal indicating the detected vehicle speed. Each time a predetermined timing comes during running, the controller 20 calculates the lean angle of the motorcycle 10 based on the angular velocity about the axis in the front-back direction and the vehicle speed.

In this preferred embodiment, the roll rate is integrated over time, and the vehicle speed is used as correction information so as to calculate the lean angle. However, in the present invention, a method for calculating the lean angle is not limited to this example. In the calculation of the lean angle, the vehicle speed is not an essential variable. For calculating the lean angle, a conventionally known method is adoptable. For example, the calculation may be performed based on a static equilibrium equation by using the yaw rate (angular velocity about an axis in the vertical direction) and the vehicle speed. The correction information is not limited to the vehicle speed. For example, it may be acceptable to provide a plurality of gyro sensors and G sensors and use values obtained from these sensors and the vehicle speed as the correction information. Instead of the vehicle speed, GPS position information and/or geomagnetic information may be used as the correction information. No particular limitation is put on sensors (detectors) that detect variables that are available for obtaining the lean angle. An appropriate sensor may be provided in accordance with variables available for the calculation.

The controller 20 preferably includes a memory (not shown). The memory stores, in the form of data, a plurality of reference values (°) to be compared with the lean angle. In this preferred embodiment, the memory preferably stores three reference values (a first reference value $K_1$, a second reference value $K_2$, and a third reference value $K_3$). The first reference value $K_1$, the second reference value $K_2$, and the third reference value $K_3$ satisfy the relationship of first reference value $K_1$ < second reference value $K_2$ < third reference value $K_3$.

The first reference value $K_1$ is associated with the sub headlight light sources 13La and 13Ra.

The second reference value $K_2$ is associated with the sub headlight light sources 13Lb and 13Rb.

The third reference value $K_3$ is associated with the sub headlight light sources 13Lc and 13Rc.

That is, the first to third reference values $K_1$ to $K_3$ are greater than 0°, and different from one another. The first to third reference values $K_1$ to $K_3$ are set to be values sequentially increasing at intervals from 0°. The interval between 0° and $K_1$ is $K_1$. When the interval between $K_2$ and $K_1$ is defined as $K_2'$ and the interval between $K_3$ and $K_2$ is defined as $K_3'$, the intervals $K_1$, $K_2'$, and $K_3'$ satisfy $K_1 > K_2' > K_3'$. In other words, a greater reference value ($K_1$ to $K_3$) has a smaller interval ($K_1$, $K_2'$, $K_3'$). However, in the present invention, the relationship between the reference value and the interval is not limited to this example.

In the motorcycle 10, in the course of a gradual increase in the lean angle along with left inclination of the motorcycle 10, when the lean angle reaches the first reference value $K_1$, the sub headlight light source 13La is turned on, and when the lean angle reaches the second reference value $K_2$, the sub headlight light source 13Lb is turned on, and when the lean angle reaches the third reference value $K_3$, the sub headlight light source 13Lc is turned on. Thus, the sub headlight light sources 13La, 13Lb, and 13Lc are sequentially turned on along with an increase in the lean angle. On the other hand, when the lean angle decreases, the sub headlight light sources 13Lc, 13Lb, and 13La are sequentially turned off. The same applies to a case where the motorcycle 10 is inclined to the right.

In a preferred embodiment of the present invention, when the lean angle is less than a minimum reference value ($K_1$) (for example, at a time of running straight ahead), the sub headlight light source may be dimmed. In such a case, when the sub headlight light sources 13La, 13Lb, and 13Lc are sequentially turned on along with an increase in the lean angle, the sub headlight light sources 13Rc, 13Rb, and 13Ra may be sequentially turned off.

More specifically, when the vehicle is inclined to one side (for example, to the left) with respect to the width direction of the vehicle so that the lean angle increases, the brightness of the plurality of sub headlight light sources (13La to 13Lc) that illuminate this one side may be increased in the order from the sub headlight light source (13La) having the illumination range whose upper end edge is located lower than the sub headlight light source (13Lc) having the illumination range whose upper end edge is located higher, while the brightness of the plurality of sub headlight light sources (13Rc to 13Ra) that illuminate the other side (right side) of the vehicle with respect to the width direction of the vehicle may be reduced in the order from the sub headlight light source (13Rc) having the illumination range whose upper end edge is located higher than the sub headlight light source (13Ra) having the illumination range whose upper end edge is located lower.

Figure 3:
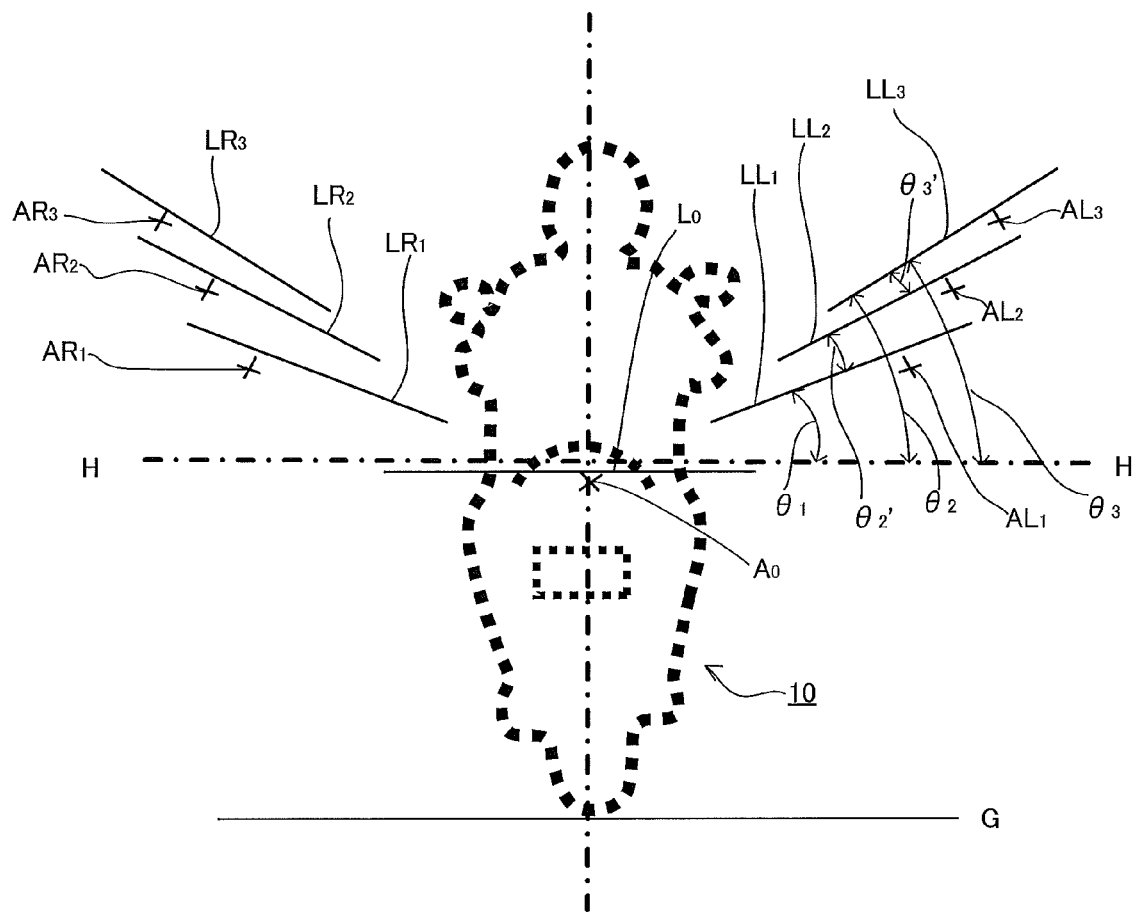
FIG. 3 is a front elevational view schematically showing optical axes and cut-off lines of the sub headlight light sources of the motorcycle in an upright state.

FIG. 3 is a front elevational view schematically showing optical axes and cut-off lines of the sub headlight light sources of the motorcycle in an upright state.

The motorcycle 10 stands upright on a flat ground G. An optical axis $A_0$ of the low beam light source 11L is located below a horizon H of the low beam light source 11L. A cut-off line $L_0$ of the low beam light source 11L is located above the optical axis $A_0$, and located below the horizon H of the low beam light source 11L. The cut-off line $L_0$ extends right and left along the width direction of the vehicle.

Firstly, optical axes $AL_1$ to $AL_3$ of the sub headlight light sources 13La to 13Lc will be described. For the sub headlight light sources 13La to 13Lc, the first reference value $K_1$, the second reference value $K_2$, and the third reference value $K_3$ are set, respectively. As described above, a greater reference value ($K_1$ to $K_3$) has a smaller interval ($K_1$, $K_2'$, $K_3'$).

The optical axes $AL_1$ to $AL_3$ of the sub headlight light sources 13La to 13Lc are located outward in the order of the optical axes $AL_1$ to $AL_3$ with respect to the width direction of the vehicle. The optical axes $AL_1$ to $AL_3$ of the sub headlight light sources 13La to 13Lc are located above the optical axis $A_0$ of the low beam light source 11L. With respect to the width direction of the motorcycle 10, outer edges of the illumination ranges of the sub headlight light sources 13La to 13Lc having a predetermined illuminance are, similarly to the optical axes $AL_1$ to $AL_3$, located outward with respect to the width direction of the vehicle in the order of the sub headlight light sources 13La to 13Lc, though not shown in FIG. 3.

Inclination angles $\theta_1$ to $\theta_3$ of cut-off lines $LL_1$ to $LL_3$ of the sub headlight light sources 13La to 13Lc increase in the order of the inclination angles $\theta_1$ to $\theta_3$.

The inclination angles $\theta_1$ to $\theta_3$ of the cut-off lines $LL_1$ to $LL_3$ of the sub headlight light sources 13La to 13Lc are set to be values increasing at intervals from 0° to $\theta_1$, $\theta_2$, and $\theta_3$ in this order. The interval between 0° and $\theta_1$ is $\theta_1$. When the interval between $\theta_2$ and $\theta_1$ is defined as $\theta_2'$ and the interval between $\theta_3$ and $\theta_2$ is defined as $\theta_3'$, the intervals $\theta_1$, $\theta_2'$, and $\theta_3'$ satisfy $\theta_1 > \theta_2' > \theta_3'$. In other words, a larger inclination angle ($\theta_1$ to $\theta_3$) has a smaller interval ($\theta_1$, $\theta_2'$, $\theta_3'$).

No particular limitation is put on the relationship between the inclination angle ($\theta_1$ to $\theta_3$) of the cut-off line ($LL_1$ to $LL_3$) of each sub headlight light source (13La to 13Lc) and the reference value ($K_1$ to $K_3$) set for the sub headlight light source (13La to 13Lc). These values (angles) may be either different or the same. A state where these values are the same includes a state where these values are substantially the same.

The cut-off lines $LL_1$ to $LL_3$ of the sub headlight light sources 13La to 13Lc define the upper end edges of the illumination ranges of the sub headlight light sources 13La to 13Lc, respectively, though not shown in FIG. 3. Therefore, the illumination ranges of the sub headlight light sources 13La to 13Lc are located below the cut-off lines $LL_1$ to $LL_3$ of the sub headlight light sources 13La to 13Lc. Accordingly, the illumination ranges of the sub headlight light sources 13La to 13Lc are, in this order, located progressively higher. As the illumination ranges of the sub headlight light sources 13La to 13Lc are located progressively higher, the outer edges of the illumination range of the sub headlight light sources 13La to 13Lc having the predetermined illuminance are located farther outward. Except for whether the sub headlight light sources are provided at the right side or the left side of the symmetry, the sub headlight light sources 13Ra to 13Rc are identical to the sub headlight light sources 13La to 13Lc described above. Therefore, a description thereof will be omitted.

Figure 4:
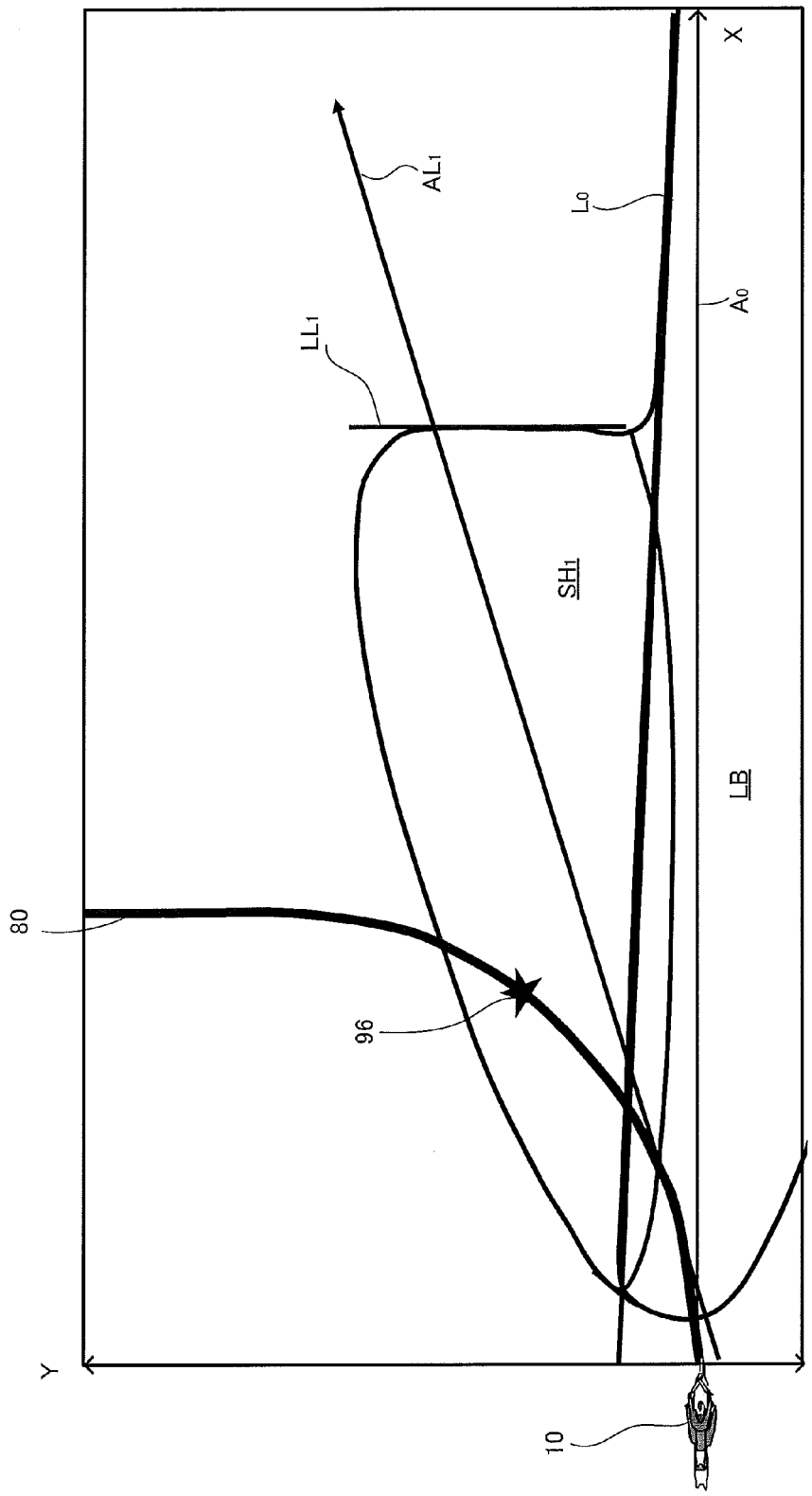
FIG. 4 is a plan view schematically showing an illumination range of a headlight having an illuminance $L_1$ in a case where a vehicle moves through a curve having a radius $R_1$ at a speed $V_1$.
Figure 5:
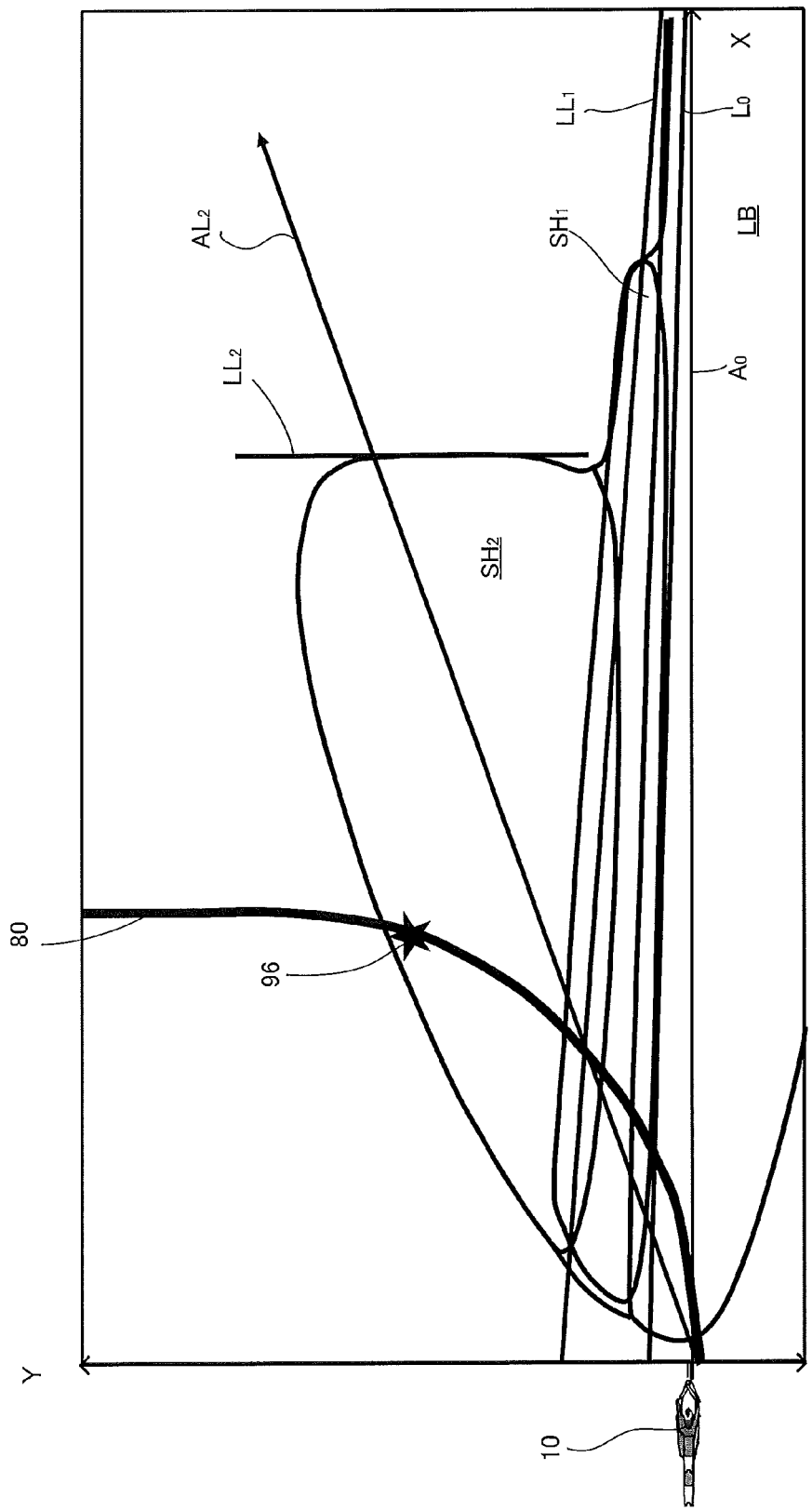
FIG. 5 is a plan view schematically showing an illumination range of a headlight having the illuminance $L_1$ in a case where a vehicle moves through a curve having the radius $R_1$ at a speed $V_2$.
Figure 6:
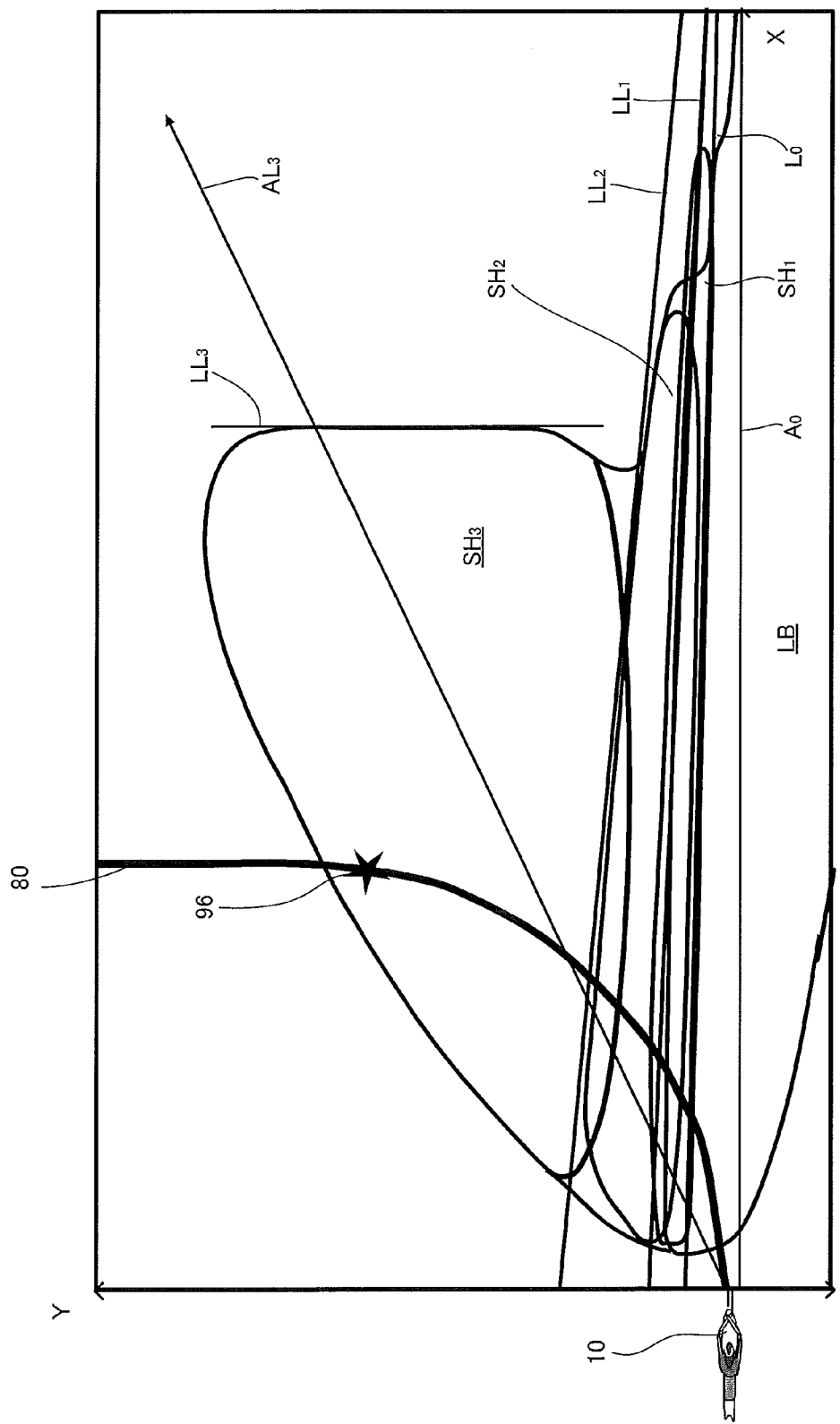
FIG. 6 is a plan view schematically showing an illumination range of a headlight having the illuminance $L_1$ in a case where a vehicle moves through a curve having the radius $R_1$ at a speed $V_3$.

Next, with reference to FIGS. 4 to 6, a description will be given to the illumination ranges of the low beam light source 11L (main headlight 11) and the sub headlight light sources 13La to 13Lc in a case where the motorcycle 10 described above moves through a curve having the radius $R_1$ at the different speeds $V_1$, $V_2$, and $V_3$. In FIGS. 4 to 6, X represents a straight ahead direction of the motorcycle 10 that leans into turns, and Y represents the left side with respect to the width direction of the motorcycle 10. The reference numeral 80 denotes a path of the motorcycle 10. The path 80 curves to the left, with a predetermined radius. The speed of the motorcycle 10 increases in the order of the speeds $V_1$, $V_2$, and $V_3$.

In FIG. 4, the motorcycle 10 moves on the path 80 while turning to the left at the speed $V_1$ (lean angle P1). The sub headlight light source 13La of the motorcycle 10 is turned on at the lean angle P1. FIG. 4 shows a state at this time.

An illumination range LB of the low beam light source 11L having the illuminance $L_1$ spreads ahead of the motorcycle 10 along the advancing direction X. Since the motorcycle 10 is inclined at the lean angle P1, the cut-off line $L_0$ of the low beam light source 11L approaches to the motorcycle 10 from the left side of the motorcycle 10 beyond the position or area 96 the rider desires to see. Therefore, the position or area 96 the rider desires to see is not covered by the illumination range LB of the low beam light source 11L having the illuminance $L_1$.

However, the sub headlight light source 13La produces illumination along the optical axis $AL_1$, so that an illumination range $SH_1$ of the sub headlight light source 13La having the illuminance $L_1$ covers the position or area 96 the rider desires to see. Accordingly, the brightness of the rider's field of view is ensured. The cut-off line $LL_1$ of the sub headlight light source 13La extends right and left along the width direction of the vehicle.

In FIG. 5, the motorcycle 10 moves on the path 80 while turning to the left at the speed $V_2$ (lean angle P2). The sub headlight light source 13Lb of the motorcycle 10 is turned on at the lean angle P2. FIG. 5 shows a state at this time.

The illumination range LB of the low beam light source 11L having the illuminance $L_1$ spreads ahead of the motorcycle 10 along the advancing direction X. The illumination range $SH_1$ of the sub headlight light source 13La having the illuminance $L_1$ extends ahead in the advancing direction X, along a left side edge of the illumination range LB of the low beam light source 11L having the illuminance $L_1$. Since the motorcycle 10 is inclined at the lean angle P2, the cut-off line $LL_1$ of the sub headlight light source 13La approaches to the motorcycle 10 from the left side of the motorcycle 10 beyond the position or area 96 the rider desires to see. Therefore, the position or area 96 the rider desires to see is not covered by the illumination range $SH_1$ of the sub headlight light source 13La having the illuminance $L_1$.

However, the sub headlight light source 13Lb produces illumination along the optical axis $AL_2$, so that an illumination range $SH_2$ of the sub headlight light source 13Lb having the illuminance $L_1$ covers the position or area 96 the rider desires to see. Accordingly, the brightness of the rider's field of view is ensured. The cut-off line $LL_2$ of the sub headlight light source 13Lb extends right and left along the width direction of the vehicle.

In FIG. 6, the motorcycle 10 moves on the path 80 while turning to the left at the speed $V_3$ (lean angle P3). The sub headlight light source 13Lc of the motorcycle 10 is turned on at the lean angle P3. FIG. 6 shows a state at this time.

The illumination range LB of the low beam light source 11L having the illuminance $L_1$ spreads ahead of the motorcycle 10 along the advancing direction X. Each of the illumination ranges $SH_1$ and $SH_2$ of the sub headlight light sources 13La and 13Lb having the illuminance $L_1$ extends ahead in the advancing direction X, along the left side edge of the illumination range LB of the low beam light source 11L having the illuminance $L_1$. Since the motorcycle 10 is inclined at the lean angle P3, the cut-off line $LL_2$ of the sub headlight light source 13Lb approaches to the motorcycle 10 from the left side of the motorcycle 10 beyond the position or area 96 the rider desires to see. Therefore, the position or area

96 the rider desires to see is not covered by the illumination range $SH_2$ of the sub headlight light source 13Lb having the illuminance $L_1$.

However, the sub headlight light source 13Lc produces illumination along the optical axis $AL_3$, so that an illumination range $SH_3$ of the sub headlight light source 13Lc having the illuminance $L_1$ covers the position or area 96 the rider desires to see. Accordingly, the brightness of the rider's field of view is ensured. The cut-off line $LL_3$ of the sub headlight light source 13Lc extends right and left along the width direction of the vehicle.

As shown in FIGS. 4 to 6, in the course of the motorcycle 10 increasing the lean angle while turning to the left, the sub headlight light source 13La is firstly turned on when the cut-off line $L_0$ of the low beam light source 11L is approaching to the motorcycle 10 from the left side of the motorcycle 10, and the sub headlight light source 13Lb is turned on when the cut-off line $LL_1$ of the sub headlight light source 13La is approaching to the motorcycle 10 from the left side of the motorcycle 10.

As has been described above, in this preferred embodiment, as the reference values $K_1$ to $K_3$ of the sub headlight light sources 13La to 13Lc are greater, the outer edges of the illumination ranges $SH_1$ to $SH_0$ of the sub headlight light sources 13La to 13Lc having the predetermined illuminance $L_1$ are located farther outward with respect to the width direction Y of the vehicle in a plan view (FIGS. 4 to 6). Accordingly, in the same curve, as the speed increases, a position that is farther outward with respect to the width direction of the vehicle is illuminated. Therefore, a change in the rider's line of sight can be responded to. This enables illumination to be performed with an illumination range suitable for each of a wide variety of running scenes.

Figure 7:
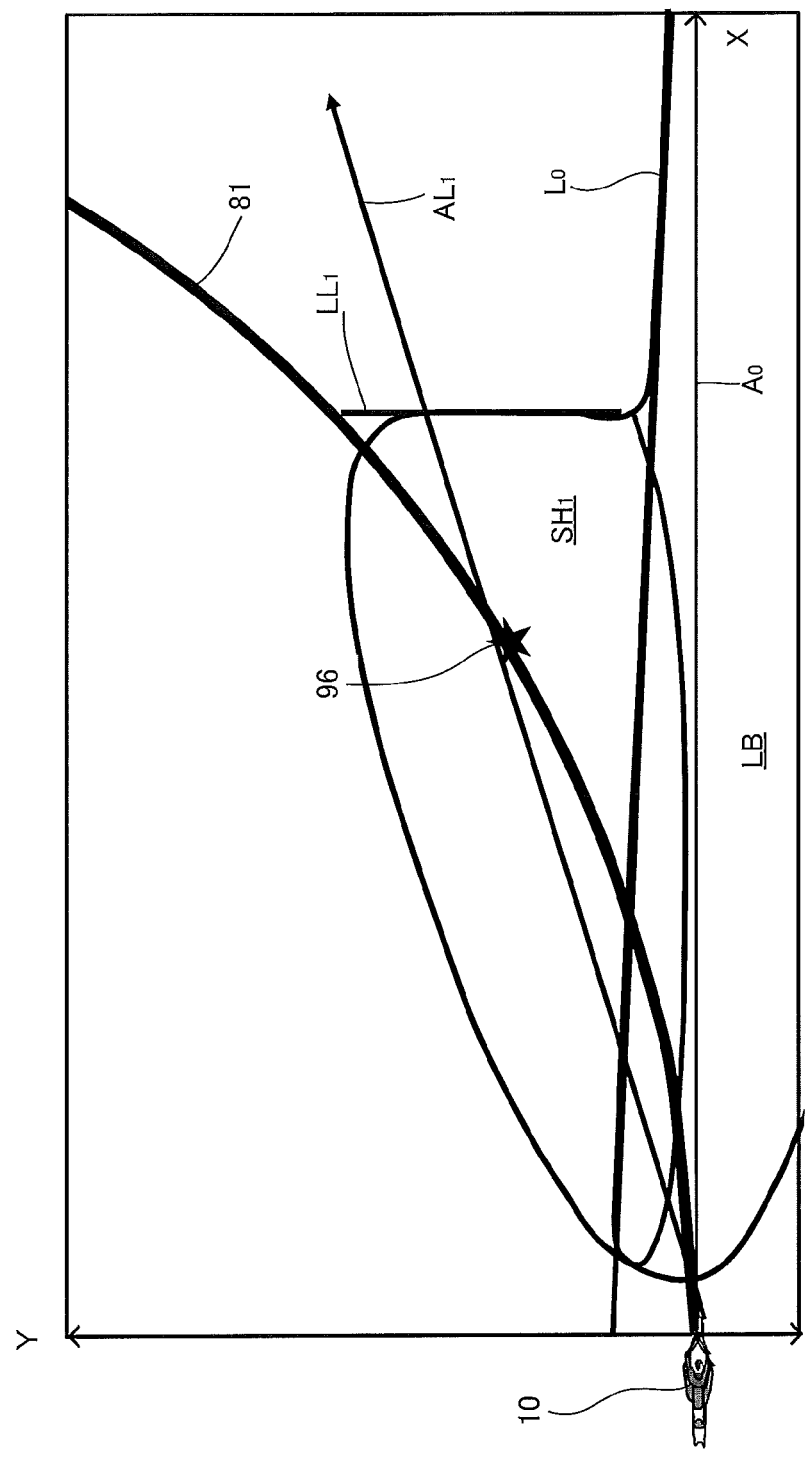
FIG. 7 is a plan view schematically showing an illumination range of a headlight having the illuminance $L_1$ in a case where a vehicle moves through a curve having a radius $R_4$ at a speed $V_4$.
Figure 8:
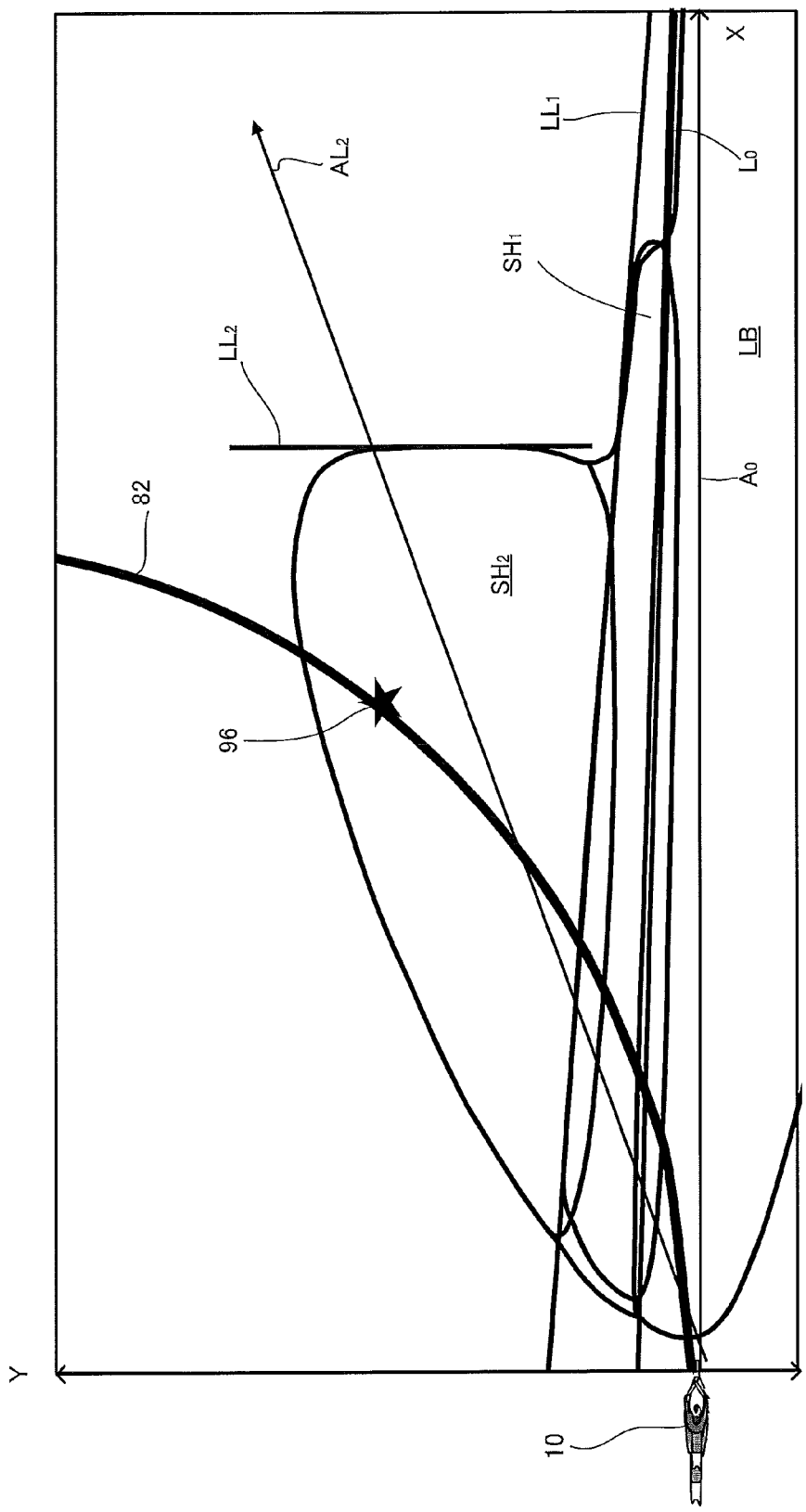
FIG. 8 is a plan view schematically showing an illumination range of a headlight having the illuminance $L_1$ in a case where a vehicle moves through a curve having a radius $R_3$ at the speed $V_4$.
Figure 9:
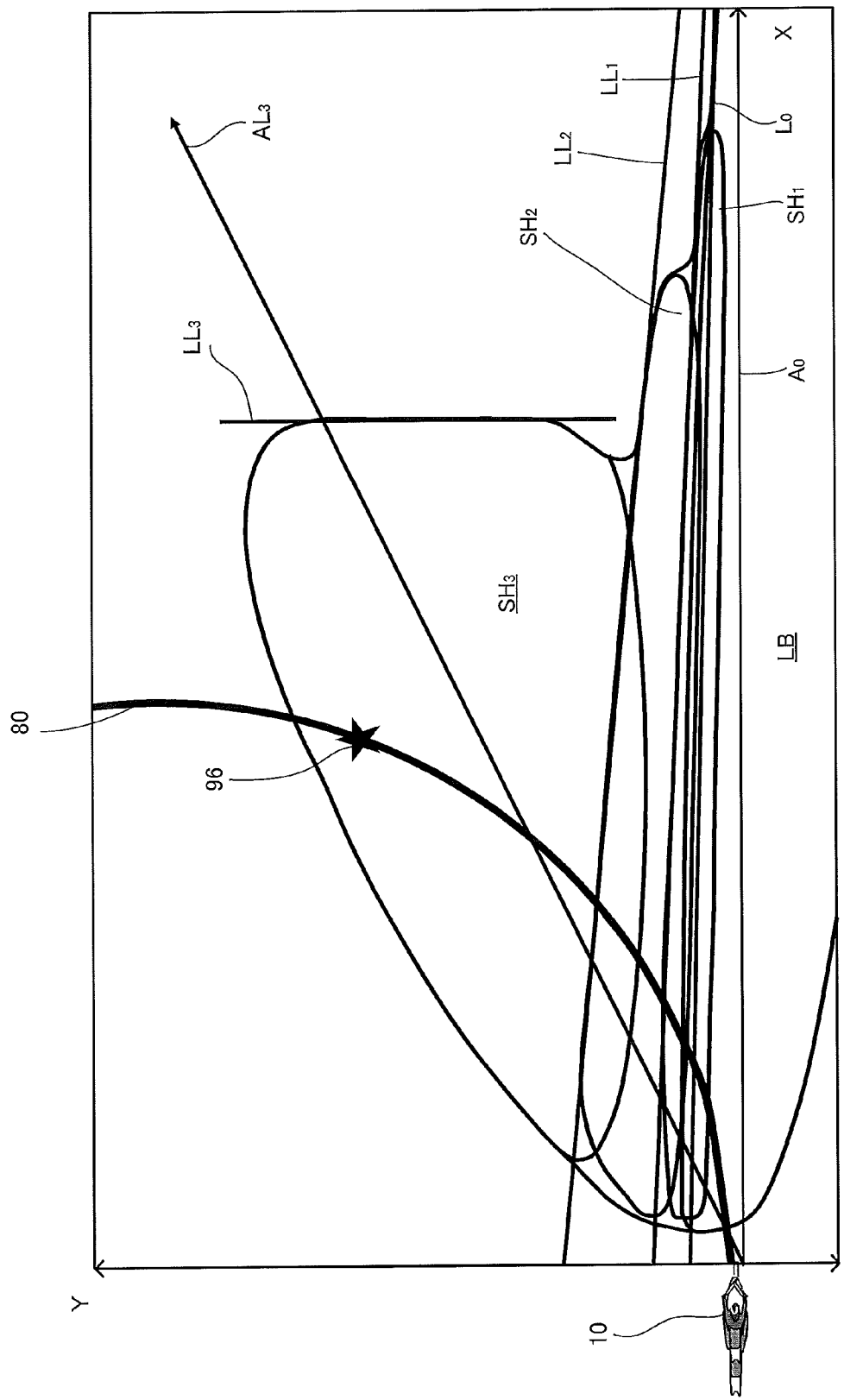
FIG. 9 is a plan view schematically showing an illumination range of a headlight having the illuminance $L_1$ in a case where a vehicle moves through a curve having a radius $R_2$ at the speed $V_4$.

Next, with reference to FIGS. 7 to 9, a description will be given to the illumination ranges of the low beam light source 11L (main headlight 11) and the sub headlight light sources 13La to 13Lc in a case where the motorcycle 10 moves through the curves 81, 82, and 83 having the different radii $R_4$, $R_3$, and $R_2$ at the speed $V_4$. In FIGS. 7 to 9, the motorcycle 10 moves through the curves having the different radii $R_4$, $R_3$, and $R_2$ at the same vehicle speed $V_4$, while in FIGS. 4 to 6, the motorcycle 10 moves on the same curve $R_1$ at the different vehicle speeds $V_1$, $V_2$, and $V_3$. Except for this point, contents of FIGS. 7 to 9 preferably are the same as contents of FIGS. 4 to 6. Therefore, in FIGS. 7 to 9, the same configurations as the configurations shown in FIGS. 4 to 6 are denoted by the same reference numerals. In the following, differences of FIGS. 7 to 9 from FIGS. 4 to 6 will be mainly described, and a description of the points common to FIGS. 4 to 6 and FIGS. 7 to 9 will be omitted. The radii $R_4$, $R_3$, and $R_2$ satisfy the relationship of $R_4 > R_3 > R_2$. The lean angle of the motorcycle 10 when the motorcycle 10 moves through curves having the different radii $R_4$, $R_3$, and $R_2$ at the speed $V_4$ are P1, P2, and P3 (P1<P2<P3), respectively.

FIG. 7 is a plan view schematically showing the illumination range of the headlight having the illuminance $L_1$ in a case where the motorcycle 10 moves through the curve 81 having the radius $R_4$ at the speed $V_4$.

In a situation shown in FIG. 7, the position or area 96 the rider desires to see is not covered by the illumination range LB of the low beam light source 11L having the illuminance $L_1$. However, the sub headlight light source 13La produces illumination along the optical axis $AL_1$, so that the illumination range $SH_1$ of the sub headlight light source 13La having the illuminance $L_1$ covers the position or area 96 the rider desires to see. Accordingly, the brightness of the rider's field of view is ensured.

FIG. 8 is a plan view schematically showing the illumination range of the headlight having the illuminance $L_1$ in a case where the motorcycle 10 moves through the curve 82 having the radius $R_3$ at the speed $V_4$.

In a situation shown in FIG. 8, the position or area 96 the rider desires to see is not covered by the illumination range $SH_1$ of the sub headlight light source 13La having the illuminance $L_1$. However, the sub headlight light source 13Lb produces illumination along the optical axis $AL_2$, so that the illumination range $SH_2$ of the sub headlight light source 13Lb having the illuminance $L_1$ covers the position or area 96 the rider desires to see. Accordingly, the brightness of the rider's field of view is ensured.

FIG. 9 is a plan view schematically showing the illumination range of the headlight having the illuminance $L_1$ in a case where the motorcycle 10 moves through the curve 83 having the radius $R_2$ at the speed $V_4$.

In FIG. 9, the position or area 96 the rider desires to see is not covered by the illumination range $SH_2$ of the sub headlight light source 13Lb having the illuminance $L_1$. However, the sub headlight light source 13Lc produces illumination along the optical axis $AL_3$, so that the illumination range $SH_3$ of the sub headlight light source 13Lc having the illuminance $L_1$ covers the position or area 96 the rider desires to see. Accordingly, the brightness of the rider's field of view is ensured.

As described above, in this preferred embodiment, as the reference values $K_1$ to $K_3$ of the sub headlight light sources 13La to 13Lc are greater, the outer edges of the illumination ranges $SH_1$ to $SH_3$ of the sub headlight light sources 13La to 13Lc having the predetermined illuminance $L_1$ are located farther outward with respect to the width direction Y of the vehicle in a plan view (FIGS. 7 to 9). Accordingly, in running the same vehicle speed, as the radius of a curve is smaller, a farther outward position with respect to the width direction of the vehicle is illuminated. This enables illumination to be performed with an illumination range suitable for each of a wide variety of running scenes.

Next, the positional relationship between the illumination ranges $SH_1$, $SH_2$, and $SH_3$ of the sub headlight light sources 13La to 13Lc having the illuminance $L_1$ will be described with reference to FIG. 10.

Figure 10:
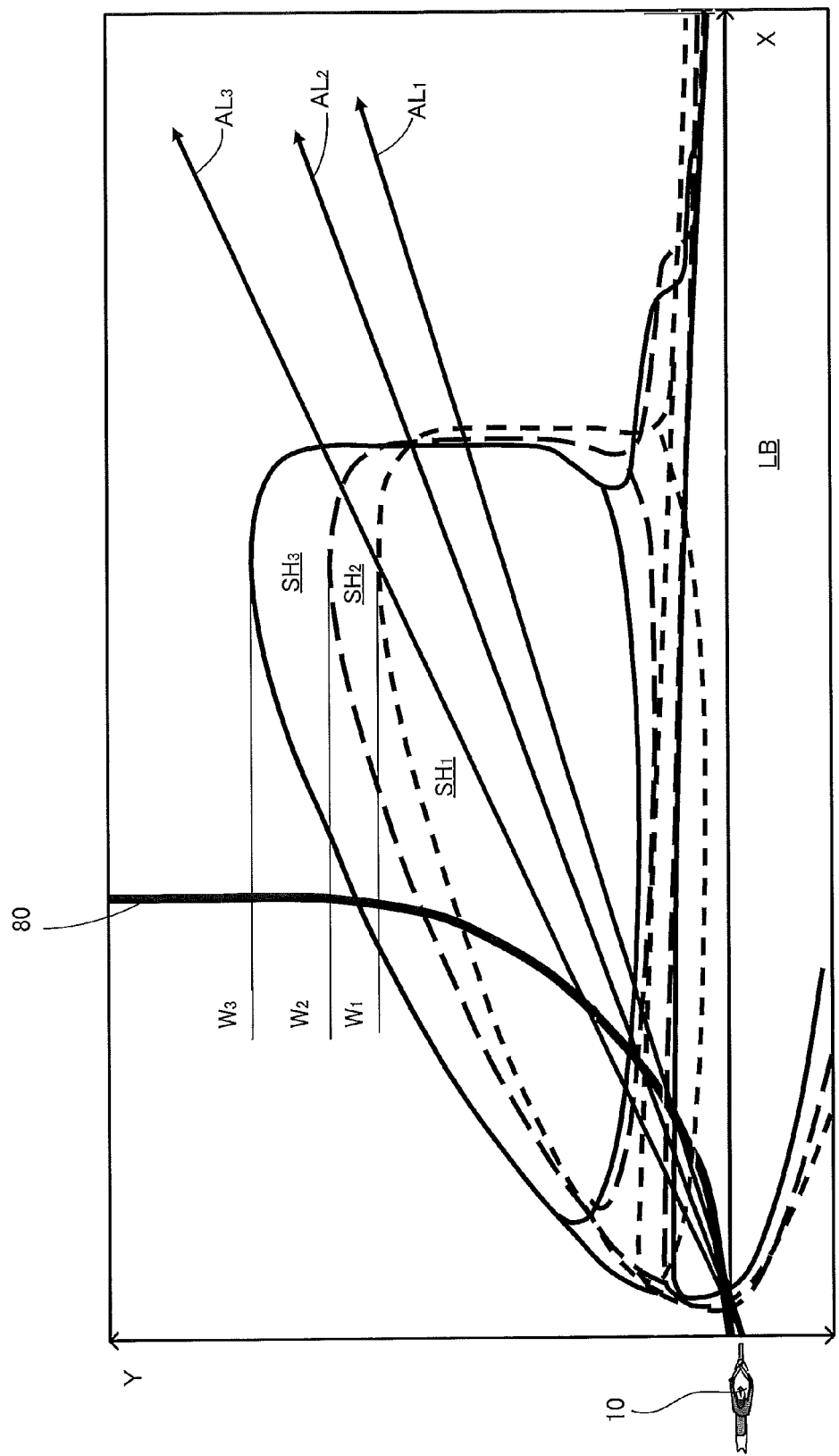
FIG. 10 is a plan view for the comparison among the illumination ranges having the illuminance $L_1$ shown in FIGS. 4 to 6.

FIG. 10 is a plan view for the comparison among the illumination ranges having the illuminance $L_1$ shown in FIGS. 4 to 6.

When the motorcycle 10 is inclined at the lean angle P1, the sub headlight light source 13La produces illumination along the optical axis $AL_1$, to generate the illumination range $SH_1$ (FIG. 4). $W_1$ indicates an outer edge of the illumination range $SH_1$ with respect to the width direction of the vehicle.

When the motorcycle 10 is inclined at the lean angle P2, the sub headlight light source 13Lb produces illumination along the optical axis $AL_2$, to generate the illumination range $SH_2$ (FIG. 5). $W_2$ indicates an outer edge of the illumination range $SH_2$ with respect to the width direction of the vehicle.

When the motorcycle 10 is inclined at the lean angle P3, the sub headlight light source 13Lc produces illumination along the optical axis $AL_3$, to generate the illumination range $SH_3$ (FIG. 6). $W_3$ indicates an outer edge of the illumination range $SH_3$ with respect to the width direction of the vehicle.

In this preferred embodiment, the outer edges $W_1$, $W_2$, and $W_3$ of the illumination ranges $SH_1$, $SH_2$, and $SH_3$ are located outward in the order of $W_1$, $W_2$, and $W_3$ with respect to the width direction Y of the vehicle. In other words, as the reference values $K_1$ to $K_3$ of the sub headlight light sources 13La to 13Lc are greater, the outer edges $W_1$, $W_2$, and $W_3$ of the illumination ranges $SH_1$, $SH_2$, and $SH_3$ of the sub headlight light sources 13La to 13Lc having the illuminance $L_1$ are located farther outward with respect to the width direction Y of the motorcycle 10 in a plan view (FIG. 10). This makes it easy that the illumination ranges $SH_1$, $SH_2$, and $SH_3$ cover the position or area 96 the rider desires to see (FIGS. 4 to 6). Thus, an occurrence of a time period during which the illumination ranges $SH_1$, $SH_2$, and $SH_3$ cannot sufficiently cover the position or area 96 the rider desires to see is more reliably prevented.

In FIG. 10, the outer edges $W_1$, $W_2$, and $W_3$ of the illumination ranges $SH_1$, $SH_2$, and $SH_3$ having the illuminance $L_1$ are located outward in the order of $W_1$, $W_2$, and $W_3$ with respect to the width direction Y of the vehicle. This positional relationship is, however, established even when the illuminance is not $L_1$.

Figure 11:
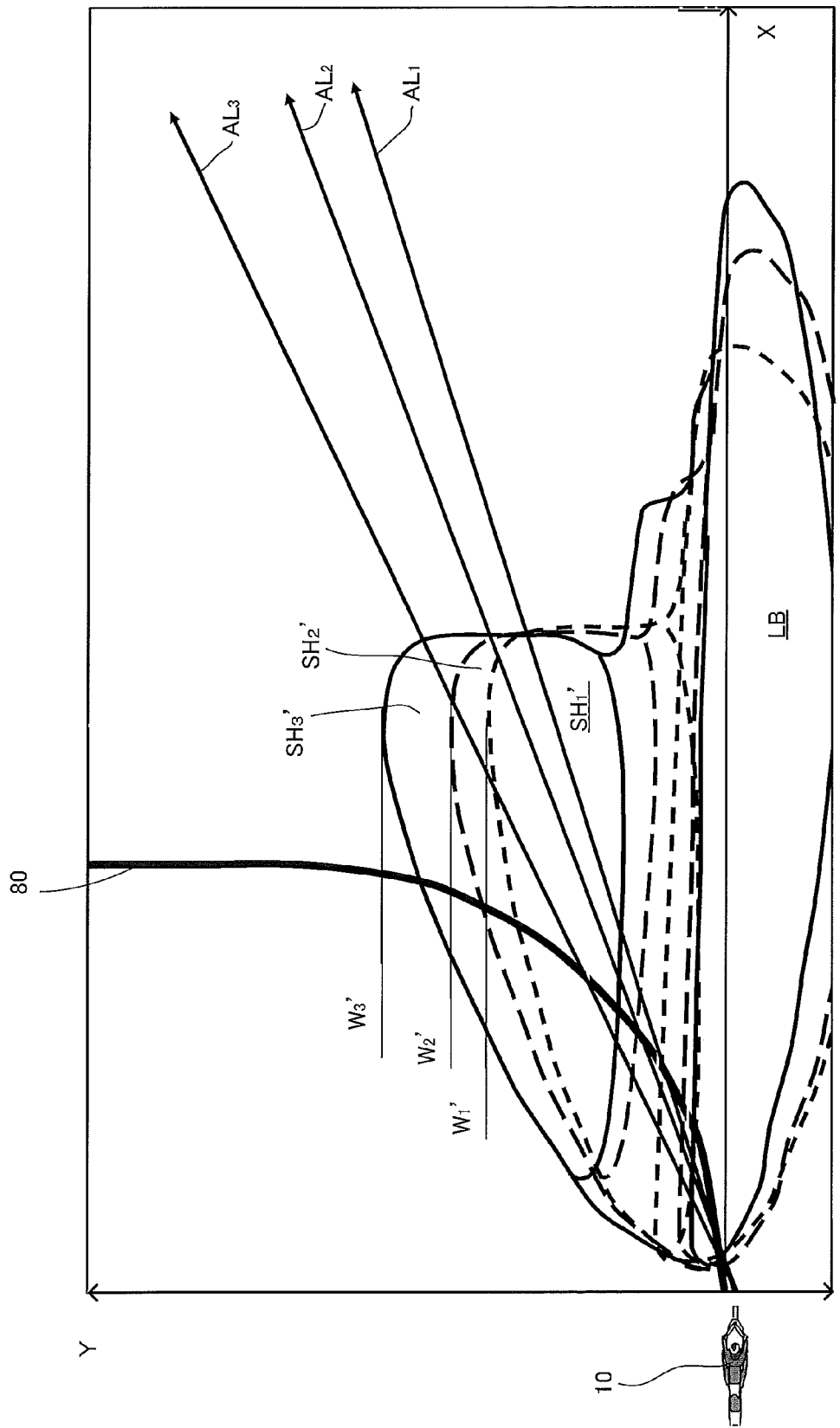
FIG. 11 is a plan view for the comparison among illumination ranges having an illuminance $L_2$ ($L_2 > L_1$) under the same circumstances as in FIG. 10.

FIG. 11 is a plan view for the comparison among illumination ranges having an illuminance $L_2$ ($L_2 > L_1$) under the same circumstances as in FIG. 10.

Illumination ranges $SH_1'$, $SH_2'$, and $SH_3'$ are generated by the sub headlight light sources 13La, 13Lb, and 13Lc, respectively, and located inside the illumination ranges $SH_1$, $SH_2$, and $SH_3$ (FIG. 10), respectively. Outer edges $W_1'$, $W_2'$, and $W_3'$ of the illumination ranges $SH_1'$, $SH_2'$, and $SH_3'$ are located outward in the order of $W_1'$, $W_2'$, and $W_3'$ with respect to the width direction Y of the vehicle. In other words, as the reference values $K_1$ to $K_3$ of the sub headlight light sources 13La to 13Lc are greater, the outer edges $W_1'$, $W_2'$, and $W_3'$ of the illumination ranges $SH_1'$, $SH_2'$, and $SH_3'$ of the sub headlight light sources 13La to 13Lc having the illuminance $L_2$ are located farther outward with respect to the width direction Y of the motorcycle 10 in a plan view (FIG. 11). In this manner, even in a case of the illuminance $L_2$, the above-described positional relationship is established.

An isolux curve of each illuminance in the illumination range of the sub headlight light source in a plan view preferably has an annular shape surrounding a maximum illuminance portion. An isolux curve of a lower illuminance is more distant from the maximum illuminance portion than an isolux curve of a higher illuminance is. This positional relationship is established irrespective of the illuminance level. Therefore, in the present invention, no particular limitation is put on which illuminance is to be used in the comparison among the positions of the outer edges of the illumination ranges of the respective sub headlight light sources. The illuminance used in the comparison may be set as appropriate. As shown in FIGS. 10 and 11, even though the illuminance is changed, the same result is obtained from the comparison among the outer edges.

As has been described above, in the motorcycle 10, as the reference values $K_1$ to $K_3$ of the sub headlight light sources 13La to 13Lc, 13Ra to 13Rc are greater, the outer edges $W_1$, $W_2$, and $W_3$ of the illumination ranges $SH_1$, $SH_2$, and $SH_3$ of the sub headlight light sources 13La to 13Lc, 13Ra to 13Rc having the predetermined illuminance are located outward with respect to the width direction Y of the motorcycle 10 in a plan view. Accordingly, as the lean angle of the vehicle is larger, a farther outward position with respect to the width direction of the vehicle is illuminated. This can respond to a change in the line of sight of a rider who is seeking to see a position farther ahead in a path or a position farther into a curve. As a result, illumination can be performed with an illumination range suitable for each of a wide variety of running scenes.

Next, another preferred embodiment of the present invention will be described with reference to FIGS. 12 to 17. In FIGS. 12 to 17, configurations corresponding to the configurations shown in FIGS. 1 to 11 are denoted by the same reference numerals as in FIGS. 1 to 11. Also in the preferred embodiment shown in FIGS. 12 to 17, in accordance with an increase in the lean angle, the sub headlight light sources 13La, 13Lb, and 13Lc of the sub headlight unit 13L reach a predetermined brightness sequentially in this order. Except for whether the sub headlight unit is provided at the right side or the left side of the symmetry, the sub headlight unit 13R preferably is identical to the sub headlight unit 13L. In a motorcycle shown in FIGS. 12 to 17, a basic configuration and an illumination range of the sub headlight light source are substantially the same as in the preferred embodiment (FIGS. 2 to 11) shown in FIGS. 1 to 11. Therefore, a description thereof will be omitted. In the following, configurations different from the configurations shown in FIGS. 1 to 11 will be mainly described.

Figure 12:
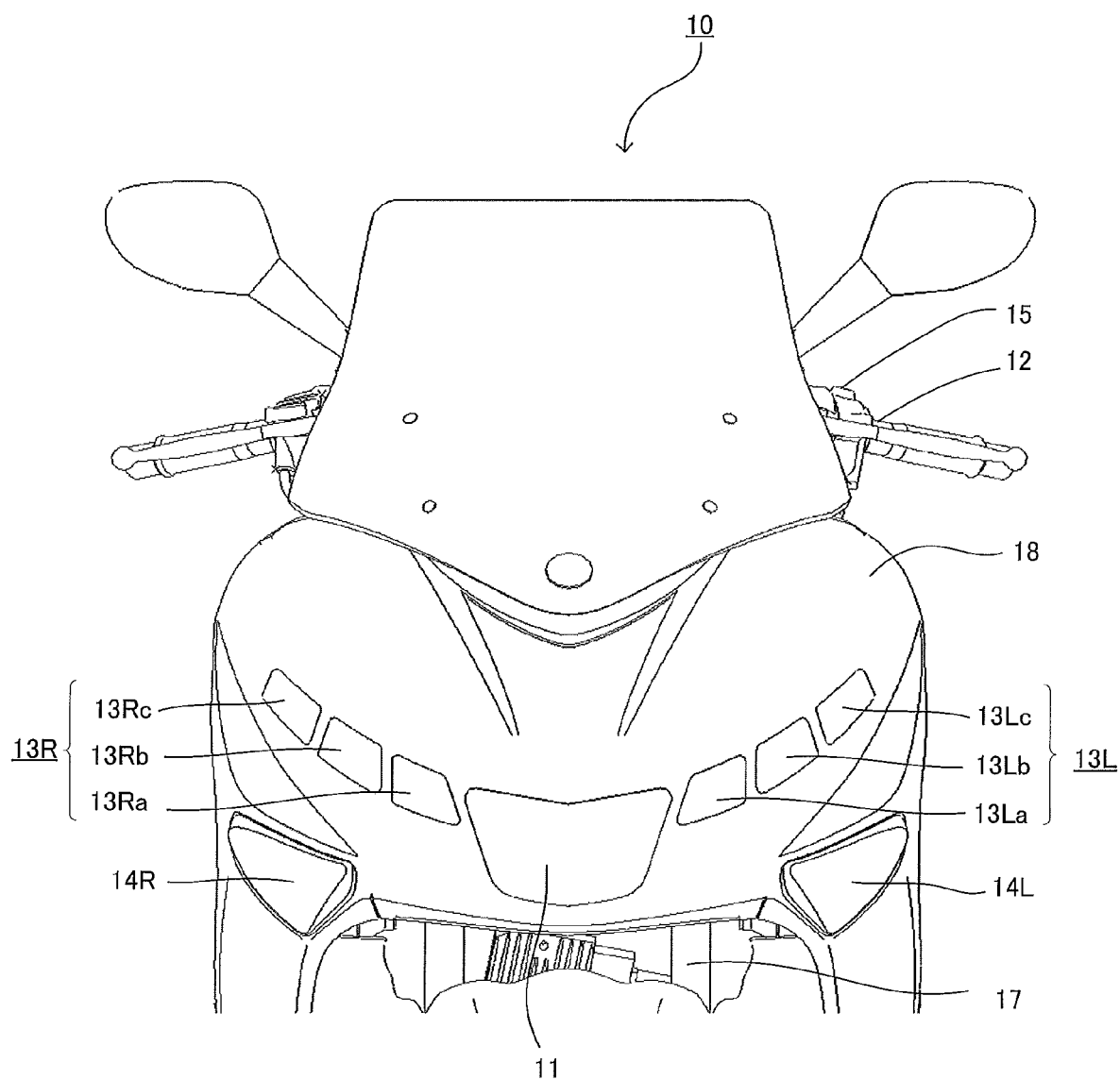
FIG. 12 is a front elevational view schematically showing, on an enlarged scale, a portion of a motorcycle according to another preferred embodiment of the present invention.
Figure 13:
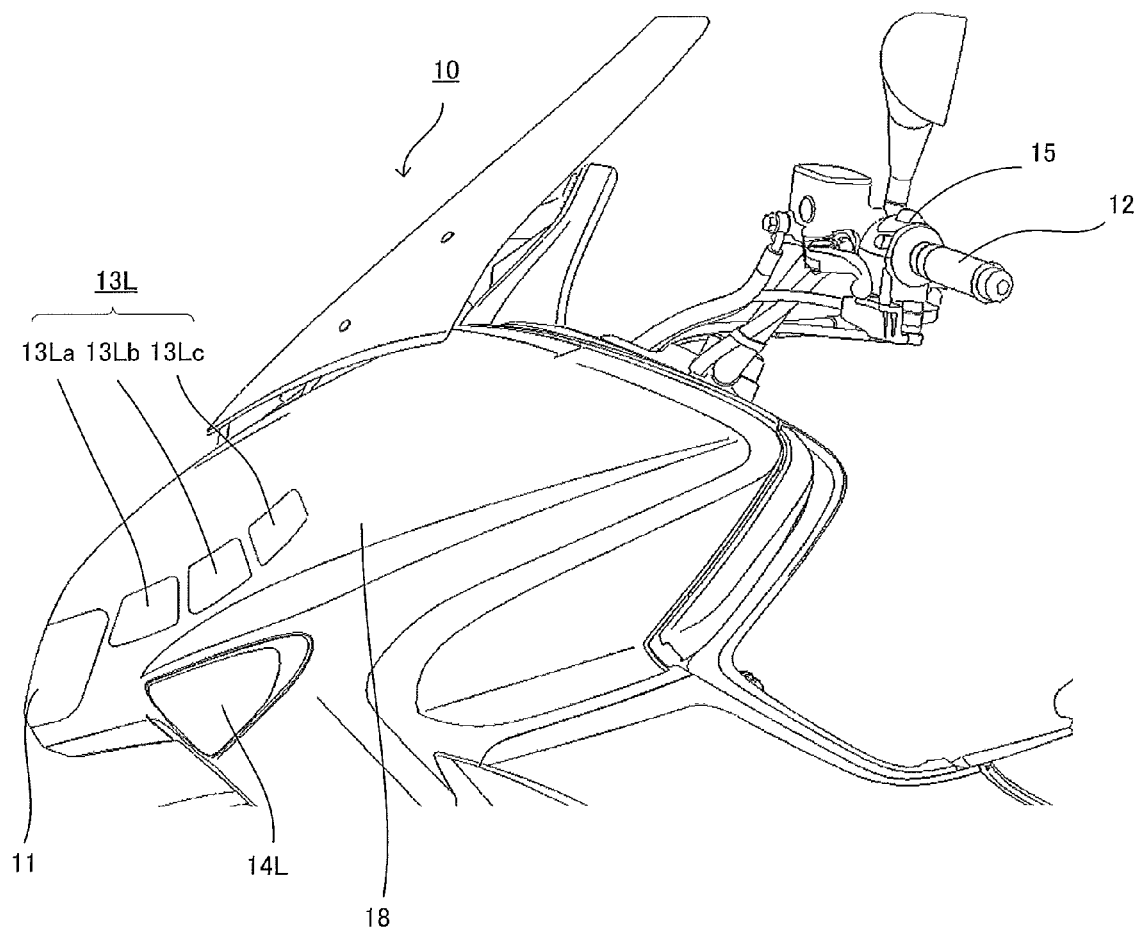
FIG. 13 is a left side view showing, on an enlarged scale, a portion of the motorcycle shown in FIG. 12.

FIG. 12 is a front elevational view schematically showing, on an enlarged scale, a portion of a motorcycle according to another preferred embodiment of the present invention. FIG. 13 is a left side view showing, on an enlarged scale, a portion of the motorcycle shown in FIG. 12.

A motorcycle 10 preferably includes two sub headlight units 13L and 13R of variable light distribution type. Each of the sub headlight units 13L and 13R is provided at each side with respect to the width direction of the vehicle.

The sub headlight unit 13L includes a plurality of sub headlight light sources 13La, 13Lb, and 13Lc. The sub headlight light sources 13La, 13Lb, and 13Lc are sequentially arranged from the center in an upward and outward direction with respect to the width direction of the vehicle. That is, the sub headlight light sources 13La, 13Lb, and 13Lc are arranged in this order from the inside to the outside, and arranged in this order from the lower side to the upper side.

The plurality of sub headlight light sources 13La, 13Lb, and 13Lc are arranged adjacent one another. The sub headlight light sources 13La and 13Lb neighbor each other, and the sub headlight light sources 13Lb and 13Lc neighbor each other. When the motorcycle 10 is in the upright state, the positions of the sub headlight light sources arranged adjacent to one another are partially coincident with respect to a height direction. The plurality of sub headlight light sources 13La, 13Lb, and 13Lc preferably are arranged in the shape of an arc protruding downward and outward.

Each of the sub headlight light sources 13La, 13Lb, and 13Lc preferably has a shape that extends from the lower and inner side with respect to the width direction of the vehicle to the upper and outer side with respect to the width direction of the vehicle. The longer sides of the sub headlight light sources 13La, 13Lb, and 13Lc extend along a direction of arrangement of the sub headlight light sources 13La, 13Lb, and 13Lc. The shorter sides of the sub headlight light sources 13La, 13Lb, and 13Lc are opposed to each other.

When the motorcycle 10 is in the upright state, the sub headlight light source 13Lc, which is positioned in an upper and outermost position among the plurality of sub headlight light sources 13La to 13Lc, is located above the main headlight 11.

When the motorcycle 10 is in the upright state (see FIG. 13), the plurality of sub headlight light sources 13La to 13Lc are located rearward of the main headlight 11.

Figure 14A:
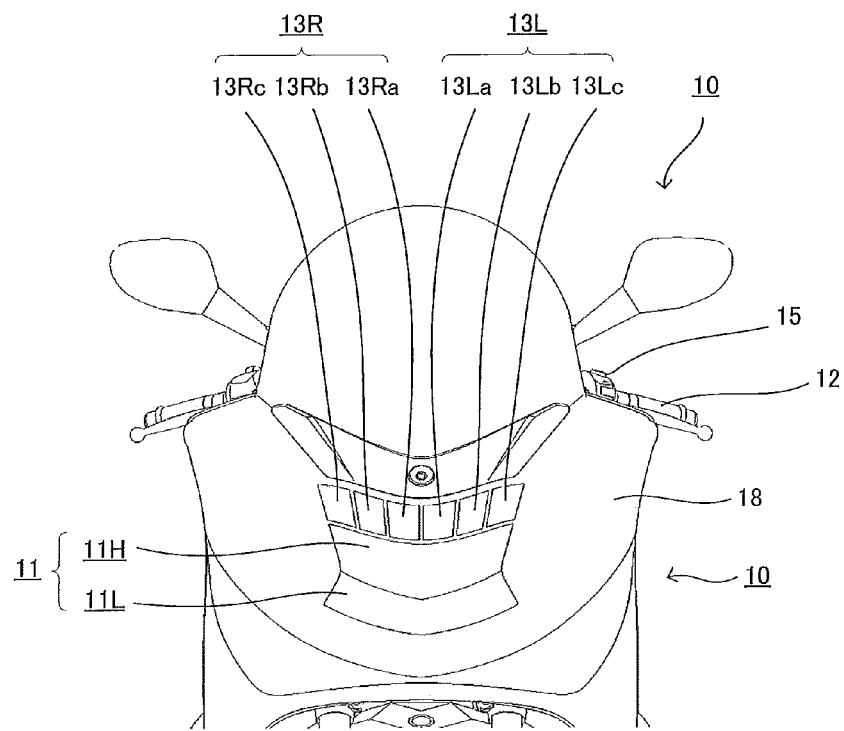
FIGS. 14A and 14B are front elevational views each schematically showing, on an enlarged scale, a portion of a motorcycle according to another preferred embodiment of the present invention.
Figure 14B:
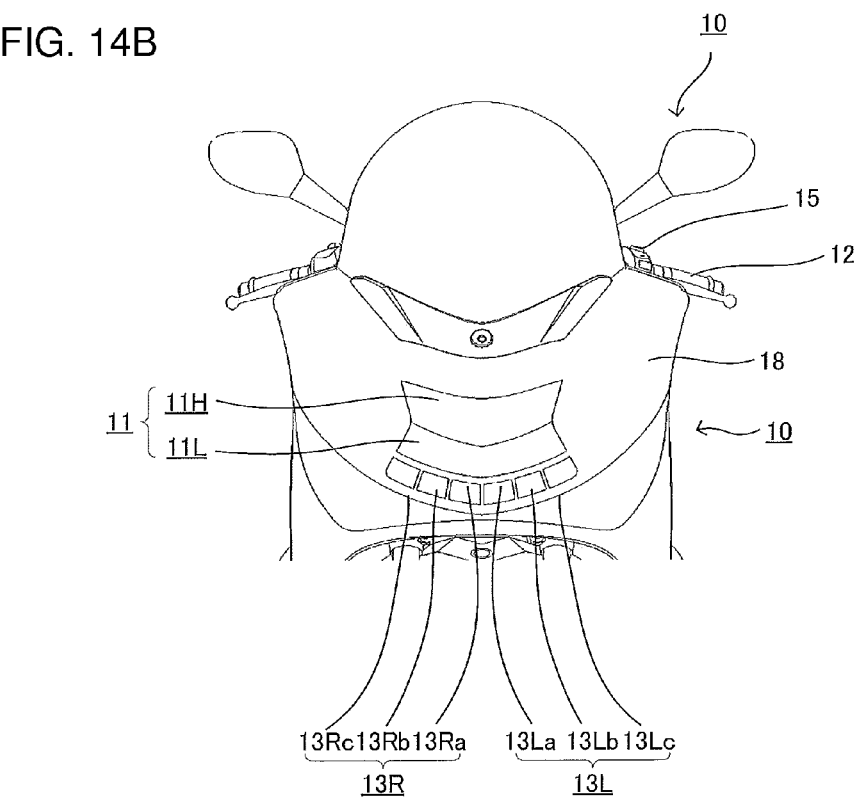

FIGS. 14A and 14B are front elevational views each schematically showing, on an enlarged scale, a portion of a motorcycle according to another preferred embodiment of the present invention.

In an example shown in FIG. 14A, the main headlight 11 is provided in a center portion on the front surface of the front cover 18 of the motorcycle 10. The main headlight 11 includes the high beam light source 11H located higher and the low beam light source 11L located lower. It may be acceptable that the high beam light source 11H is located lower and the low beam light source 11L is located higher.

A lower edge of the main headlight 11 (high beam light source 11H) extends in the horizontal direction. The sub headlight unit 13L is provided on the front cover 18 at a location above the main headlight 11. The plurality of sub headlight light sources 13La, 13Lb, and 13Lc included in the sub headlight unit 13L are arranged along the upper edge of the main headlight 11 in the horizontal direction, and overlap the main headlight 11 with respect to the vertical direction.

In FIG. 14A, each of the sub headlight light sources 13La, 13Lb, and 13Lc is shaped such that the length thereof with respect to the vertical direction is longer than the length thereof with respect to the width direction of the vehicle. The longer sides of each of the sub headlight light sources 13La, 13Lb, and 13Lc are opposed to each other. The shorter sides of each of the sub headlight light sources 13La, 13Lb, and 13Lc extend along a direction of arrangement of the sub headlight light sources 13La, 13Lb, and 13Lc.

In a preferred embodiment of the present invention, the horizontal direction includes a substantially horizontal direction. For example, in a case where the positions of all the sub headlight light sources 13La, 13Lb, and 13Lc included in the sub headlight unit 13L are partially coincident with respect to the height direction when seen from the front side of the motorcycle 10, it can be said that the sub headlight light sources 13La, 13Lb, and 13Lc are arranged in a substantially horizontal direction.

In an example shown in FIG. 14B, unlike the example shown in FIG. 14A, the sub headlight unit 13L is arranged on the front cover 18 at a location below the main headlight 11. The plurality of sub headlight light sources 13La, 13Lb, and 13Lc included in the sub headlight unit 13L are arranged along a lower edge of the main headlight 11 in the horizontal direction, and overlap the main headlight 11 with respect to the vertical direction.

In FIG. 14B, each of the sub headlight light sources 13La, 13Lb, and 13Lc is shaped such that the length thereof with respect to the width direction of the vehicle is longer than the length thereof with respect to the vertical direction. The longer sides of each of the sub headlight light sources 13La, 13Lb, and 13Lc extend along a direction of arrangement of the sub headlight light sources 13La, 13Lb, and 13Lc. The shorter sides of each of the sub headlight light sources 13La, 13Lb, and 13Lc are opposed to each other.

Figure 15:
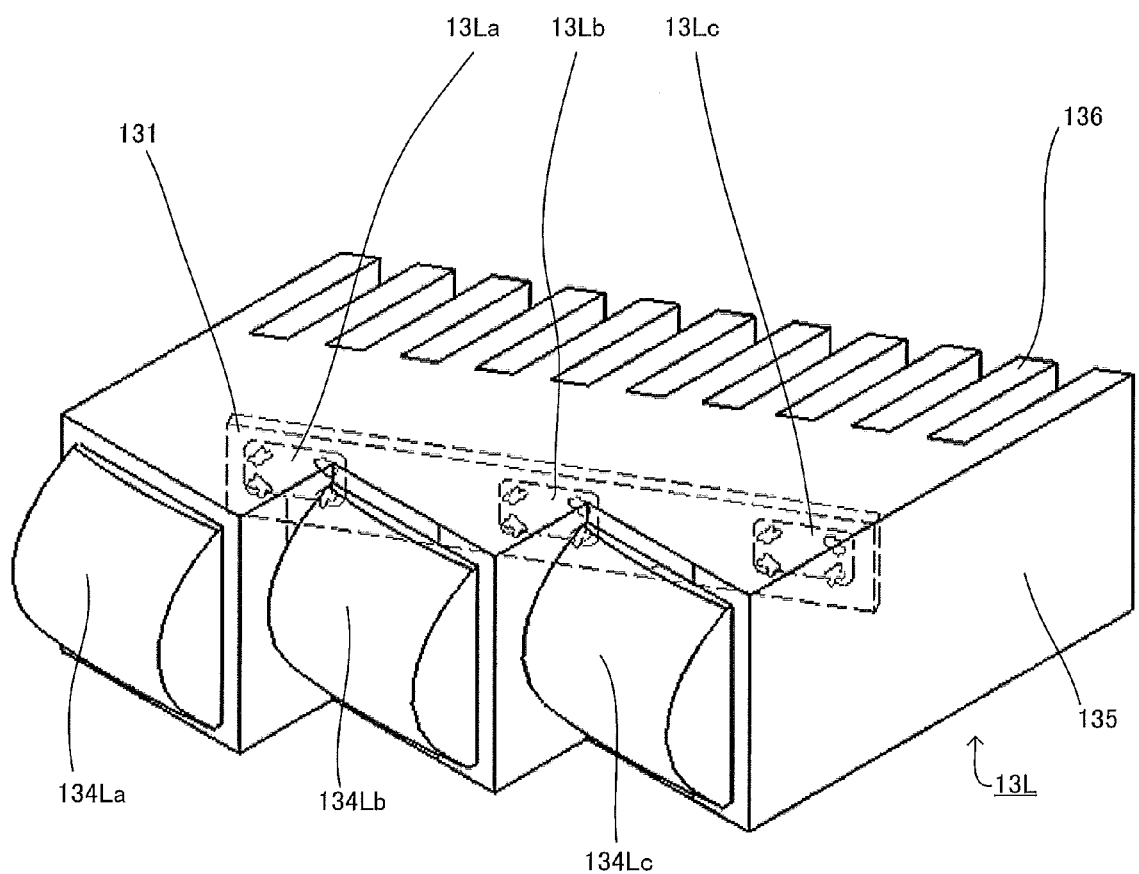
FIG. 15 is a perspective view schematically showing a sub headlight unit provided in the motorcycles shown in FIGS. 14A and 14B.

FIG. 15 is a perspective view schematically showing the sub headlight unit provided in the motorcycles shown in FIGS. 14A and 14B.

The sub headlight unit 13L includes the plurality of sub headlight light sources 13La to 13Lc. The plurality of sub headlight light sources 13La to 13Lc are mounted on a single base plate 131 having a flat plate shape. The base plate 131 is accommodated in a single casing 135. In the casing 135, a heat dissipation fin 136 integrated with the casing 135 is placed. The casing 135 and the heat dissipation fin 136 serve as a heat dissipation mechanism provided in the sub headlight unit 13. The heat dissipation mechanism is shared by the plurality of sub headlight light sources 13La to 13Lc.

The frequency of turning on the sub headlight light source 13La having a smaller reference value is higher than the frequencies of turning on the sub headlight light sources 13Lb and 13Lc having greater reference values. A time period during which the sub headlight light source 13La having a smaller reference value is turned on is longer than a time period during which the sub headlight light sources 13Lb and 13Lc having greater reference values are turned on. Here, when the sub headlight light source 13La having a smaller reference value is turned on with the predetermined brightness, the sub headlight light sources 13Lb and 13Lc having greater reference values than the sub headlight light source 13La are not turned on with the predetermined brightness. Therefore, the sub headlight light source 13La, while being turned on with the predetermined brightness, can use parts of the heat dissipation mechanism allocated to the other sub headlight light sources 13Lb and 13Lc. As a result, the heat dissipation mechanism can be downsized.

Lenses 134 (134La to 134Lc) are provided in front portions of the sub headlight light sources 13La to 13Lc. Each of the lenses 134 preferably includes a convex surface in a front portion thereof. As shown in FIG. 15, the convex surface of the lens 134 protrudes toward the front side of the vehicle. In this preferred embodiment, the lenses 134 preferably are not exposed on a surface of the front cover 18. On the front cover 18, an outer covering (not shown) having translucency is provided. The outer covering extends along the surface of the front cover 18, and is spaced apart from the lenses 134. Light emitted from the sub headlight light sources 13La to 13Lc is incident on the lenses 134. The lenses 134 generate a light distribution, which is emitted from the lenses 134. The light moves through the lenses 134, and then moves through the outer covering, to be outputted ahead and outward (toward the front left direction) of the motorcycle 10. A shape of the outer covering in this preferred embodiment corresponds to a shape of the sub headlight light sources as visually recognized from the outside of the motorcycle 10.

With reference to FIGS. 16A to 16D, a description will be given to examples in which, in accordance with an increase in the lean angle, the plurality of sub headlight light sources reach the predetermined brightness sequentially from the sub headlight light source located at the lower and inner side with respect to the width direction of the vehicle to the sub headlight light source located at the upper and outer side with respect to the width direction of the vehicle.

FIGS. 16A to 16D are front elevational views each schematically showing, on an enlarged scale, a portion of a motorcycle according to another preferred embodiment of the present invention.

Figure 16A:
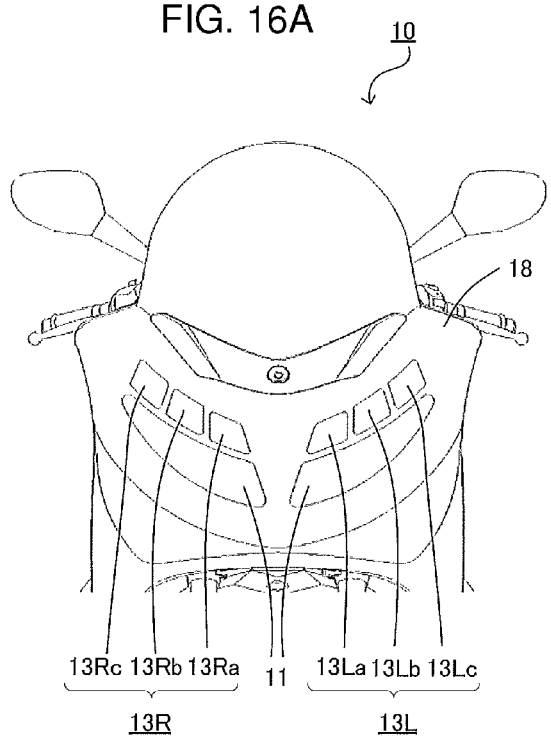
FIGS. 16A to 16D are front elevational views each schematically showing, on an enlarged scale, a portion of a motorcycle according to another preferred embodiment of the present invention.

In an example shown in FIG. 16A, the motorcycle 10 preferably includes main headlights 11 of two lamp types. Each of the main headlights 11 is arranged in each of right and left portions on the front surface of the front cover 18. The sub headlight light sources 13La, 13Lb, and 13Lc are arranged above the left-side main headlight 11.

The sub headlight light sources 13La, 13Lb, and 13Lc are arranged sequentially from the lower and inner side with respect to the width direction of the vehicle to the left and upper side with respect to the width direction of the vehicle. The positions where the sub headlight light sources 13La, 13Lb, and 13Lc are provided are misaligned with one another with respect to the width direction of the vehicle. The sub headlight light sources 13La, 13Lb, and 13Lc are arranged in the shape of an arc protruding downward and outward. The sub headlight light sources 13La, 13Lb, and 13Lc are arranged neighboring one another. The positions of the sub headlight light sources 13La, 13Lb, and 13Lc neighboring one another are partially coincident with respect to the height direction.

All the sub headlight light sources 13La, 13Lb, and 13Lc are preferably located above the main headlight 11.

Each of the sub headlight light sources 13La, 13Lb, and 13Lc has a shape that extends from the lower and inner side with respect to the width direction of the vehicle to the upper and outer side with respect to the width direction of the vehicle. The longer sides of each of the sub headlight light sources 13La, 13Lb, and 13Lc extend along a direction of arrangement of the sub headlight light sources 13La, 13Lb, and 13Lc. The shorter sides of each of the sub headlight light sources 13La, 13Lb, and 13Lc are opposed to each other.

Figure 16B:
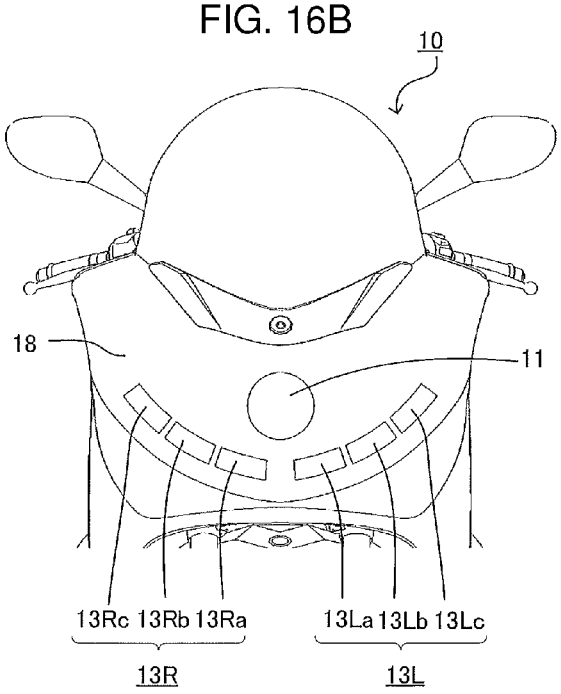

In an example shown in FIG. 16B, a main headlight 11 of single lamp type is arranged in a center portion on the front surface of the front cover 18.

The sub headlight light sources 13La, 13Lb, and 13Lc are arranged sequentially from the lower and inner side with respect to the width direction of the vehicle to the upper and outer side with respect to the width direction of the vehicle. The positions where the sub headlight light sources 13La, 13Lb, and 13Lc are provided are misaligned with one another with respect to the width direction of the vehicle. The sub headlight light sources 13La, 13Lb, and 13Lc are arranged in the shape of an arc protruding downward and outward. The sub headlight light sources 13La, 13Lb, and 13Lc are preferably arranged adjacent to one another. The positions of the sub headlight light sources 13La, 13Lb, and 13Lc adjacent to one another are partially coincident with respect to the height direction.

The sub headlight light source 13La, which is positioned lowermost, is located below the main headlight 11. With respect to the height direction, the position of the sub headlight light source 13Lc, which is positioned uppermost, is partially coincident with the position of the main headlight 11. The sub headlight light source 13Lc, which is positioned outermost, is located farther outward than the main headlight 11 with respect to the width direction of the vehicle.

Each of the sub headlight light sources 13La, 13Lb, and 13Lc has a shape that extends from the lower and inner side with respect to the width direction of the vehicle to the upper and outer side with respect to the width direction of the vehicle. The longer sides of each of the sub headlight light sources 13La, 13Lb, and 13Lc extend along a direction of arrangement of the sub headlight light sources 13La, 13Lb, and 13Lc. The shorter sides of each of the sub headlight light sources 13La, 13Lb, and 13Lc are opposed to each other.

Figure 16C:
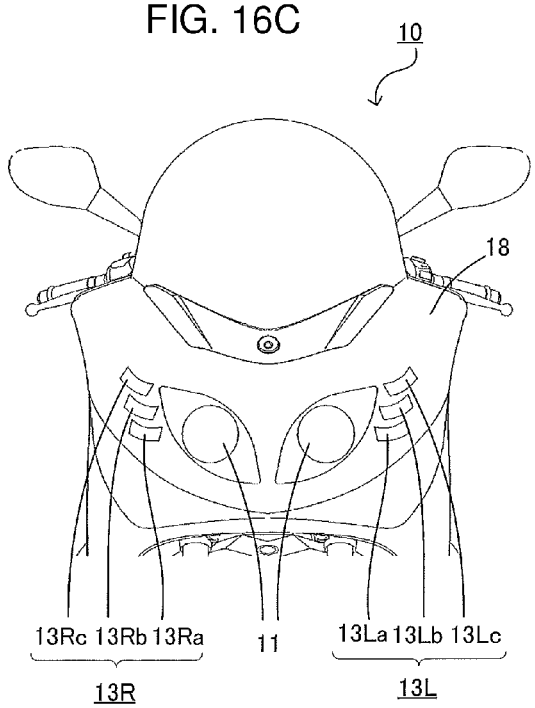

In an example shown in FIG. 16C, the motorcycle 10 preferably includes main headlights 11 of two lamp types. Each of the main headlights 11 is arranged in each of right and left portions on the front surface of the front cover 18. The sub headlight light sources 13La, 13Lb, and 13Lc are arranged at the outer side (left side) of the left main headlight 11.

The sub headlight light sources 13La, 13Lb, and 13Lc are arranged sequentially from the lower and inner side with respect to the width direction of the vehicle to the left and upper side with respect to the width direction of the vehicle. The sub headlight light sources 13La, 13Lb, and 13Lc overlap one another with respect to the vertical direction.

The sub headlight light source 13Lc, which is positioned uppermost, is located above the main headlight 11. With respect to the height direction, the position of the sub headlight light source 13La, which is positioned lowermost, is partially coincident with the position of the main headlight light source.

Each of the sub headlight light sources 13La, 13Lb, and 13Lc has a shape that extends from the lower and inner side with respect to the width direction of the vehicle to the upper and outer side with respect to the width direction of the vehicle. The longer sides of each of the sub headlight light sources 13La, 13Lb, and 13Lc are opposed to each other with respect to the vertical direction.

Figure 16D:
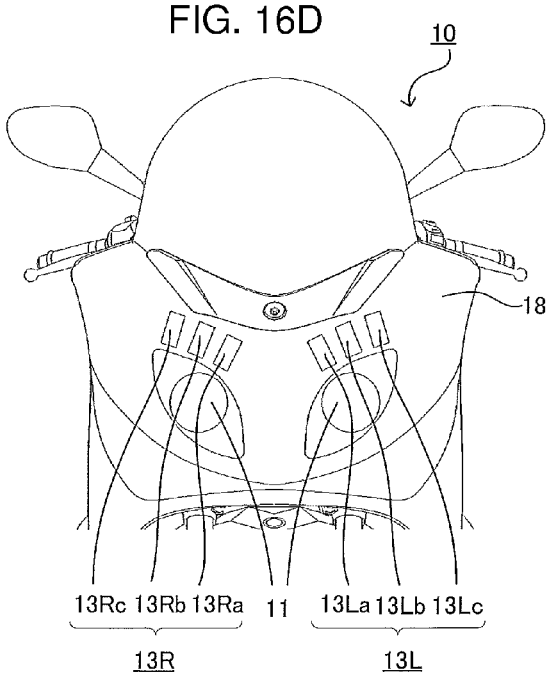

In an example shown in FIG. 16D, the motorcycle 10 preferably includes main headlights 11 of two lamp types. Each of the main headlights 11 is arranged in each of right and left portions on the front surface of the front cover 18. The sub headlight light sources 13La, 13Lb, and 13Lc are arranged above the left main headlight 11.

The sub headlight light sources 13La, 13Lb, and 13Lc are arranged sequentially from the lower and inner side with respect to the width direction of the vehicle to the left and upper side with respect to the width direction of the vehicle. The positions where the sub headlight light sources 13La, 13Lb, and 13Lc are provided are misaligned with one another with respect to the width direction of the vehicle. The sub headlight light sources 13La, 13Lb, and 13Lc are preferably arranged in the shape of an arc protruding upward and inward. The sub headlight light sources 13La, 13Lb, and 13Lc are preferably arranged adjacent to one another. The positions of the sub headlight light sources 13La, 13Lb, and 13Lc adjacent to one another are partially coincident with respect to the height direction.

All the sub headlight light sources 13La, 13Lb, and 13Lc are preferably located above the main headlight 11.

Each of the sub headlight light sources 13La, 13Lb, and 13Lc preferably has a shape that extends from the lower and outer side with respect to the width direction of the vehicle to the upper and inner side with respect to the width direction of the vehicle. The longer sides of the sub headlight light sources 13La, 13Lb, and 13Lc are opposed to each other with respect to the width direction of the vehicle. The shorter sides of each of the sub headlight light sources 13La, 13Lb, and 13Lc extend along a direction of arrangement of the sub headlight light sources 13La, 13Lb, and 13Lc.

With reference to FIGS. 17A to 17F, a description will be given to examples in which, in accordance with an increase in the lean angle, the plurality of sub headlight light sources reach the predetermined brightness sequentially from the sub headlight light source located at the upper and inner side with respect to the width direction of the vehicle to the sub headlight light source located at the lower and outer side with respect to the width direction of the vehicle.

FIGS. 17A to 17F are front elevational views each schematically showing, on an enlarged scale, a portion of a motorcycle according to another preferred embodiment of the present invention.

Figure 17A:
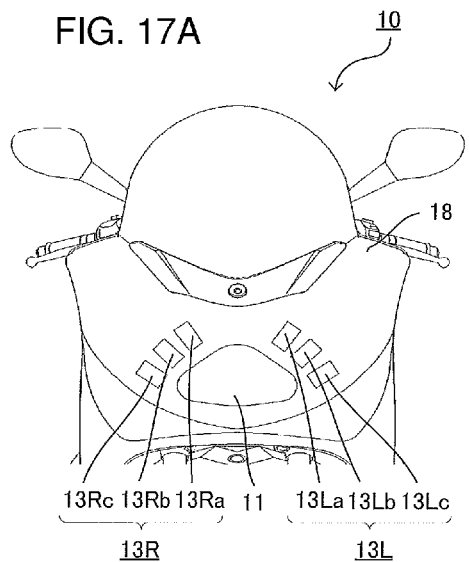
FIGS. 17A to 17F are front elevational views each schematically showing, on an enlarged scale, a portion of a motorcycle according to another preferred embodiment of the present invention.

In an example shown in FIG. 17A, a main headlight 11 of single lamp type is arranged in a center portion on the front surface of the front cover 18.

The sub headlight light sources 13La, 13Lb, and 13Lc are arranged at the upper and outer side of the main headlight 11, sequentially from the upper and inner side with respect to the width direction of the vehicle to the lower and outer side with respect to the width direction of the vehicle.

Each of the sub headlight light sources 13La, 13Lb, and 13Lc has a shape that extends from the lower and inner side with respect to the width direction of the vehicle to the upper and outer side with respect to the width direction of the vehicle. The shorter sides of each of the sub headlight light sources 13La, 13Lb, and 13Lc extend along a direction of arrangement of the sub headlight light sources 13La, 13Lb, and 13Lc. The longer sides of each of the sub headlight light sources 13La, 13Lb, and 13Lc are opposed to each other.

Figure 17D:
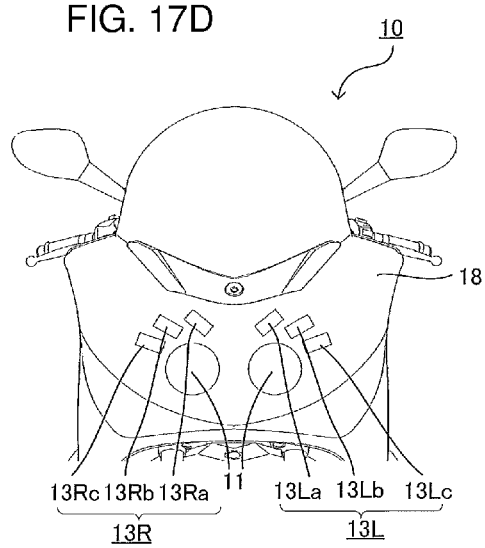
Figure 17B:
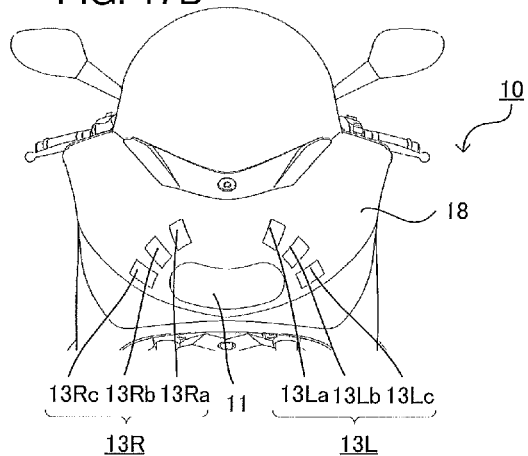

In an example shown in FIG. 17B, a main headlight 11 of single lamp type is arranged in a center portion on the front surface of the front cover 18.

The sub headlight light sources 13La, 13Lb, and 13Lc are arranged at the upper and outer side of the main headlight 11, sequentially from the upper and inner side with respect to the width direction of the vehicle to the lower and outer side with respect to the width direction of the vehicle. The sub headlight light sources 13La, 13Lb, and 13Lc are arranged in the shape of an arc protruding upward and outward.

Each of the sub headlight light sources 13La, 13Lb, and 13Lc preferably has a shape that extends from the lower and inner side with respect to the width direction of the vehicle to the upper and outer side with respect to the width direction of the vehicle. The shorter sides of each of the sub headlight light sources 13La, 13Lb, and 13Lc extend along a direction of arrangement of the sub headlight light sources 13La, 13Lb, and 13Lc. The longer sides of each of the sub headlight light sources 13La, 13Lb, and 13Lc are opposed to each other.

Figure 17E:
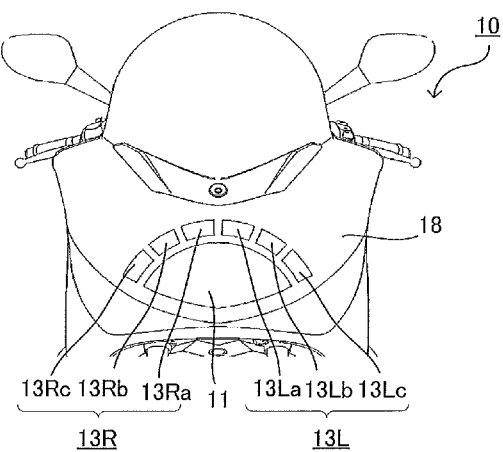
Figure 17C:
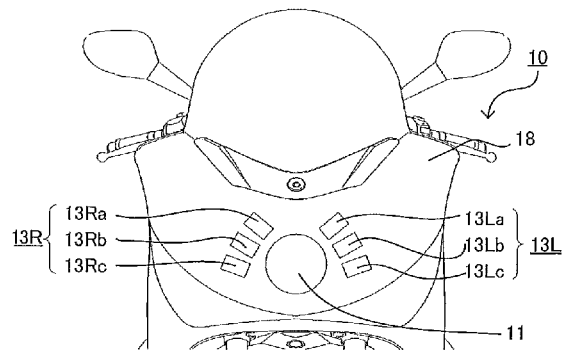

In an example shown in FIG. 17C, a main headlight 11 of single lamp type is arranged in a center portion on the front surface of the front cover 18.

The sub headlight light sources 13La, 13Lb, and 13Lc are arranged at the left side of the main headlight 11, sequentially from the upper and inner side with respect to the width direction of the vehicle to the lower and outer side with respect to the width direction of the vehicle.

Each of the sub headlight light sources 13La, 13Lb, and 13Lc preferably has a shape that extends from the lower and inner side with respect to the width direction of the vehicle to the upper and outer side with respect to the width direction of the vehicle. The shorter sides of each of the sub headlight light sources 13La, 13Lb, and 13Lc extend along with a direction of arrangement of the sub headlight light sources 13La, 13Lb, and 13Lc. The longer sides of each of the sub headlight light sources 13La, 13Lb, and 13Lc are opposed to each other.

In an example shown in FIG. 17D, the motorcycle 10 preferably includes main headlights 11 of two lamp types. Each of the main headlights 11 is arranged in each of right and left portions on the front surface of the front cover 18.

The sub headlight light sources 13La, 13Lb, and 13Lc are arranged above the main headlight 11, sequentially from the upper and inner side with respect to the width direction of the vehicle to the lower and outer side with respect to the width direction of the vehicle.

Each of the sub headlight light sources 13La, 13Lb, and 13Lc has a shape that extends from the lower and inner side with respect to the width direction of the vehicle to the upper and outer side with respect to the width direction of the vehicle. The longer sides of each of the sub headlight light sources 13La, 13Lb, and 13Lc are inclined at an inclination angle that varies among the sub headlight light sources 13La, 13Lb, and 13Lc. The longer sides of the sub headlight light source located higher are inclined with a larger inclination angle than the longer sides of the sub headlight light source located lower.

In an example shown in FIG. 17E, a main headlight 11 of single lamp type is arranged in a center portion on the front surface of the front cover 18. An upper edge of the main headlight 11 preferably has a curved shape (circular arc) protruding upward.

The sub headlight light sources 13La, 13Lb, and 13Lc are provided at one side of the main headlight 11 with respect to the width direction of the vehicle and arranged along the upper edge of the main headlight 11, sequentially from the upper and inner side with respect to the width direction of the vehicle to the lower and outer side with respect to the width direction of the vehicle. The sub headlight light sources 13La, 13Lb, and 13Lc are arranged in the shape of an arc protruding upward and outward.

Each of the sub headlight light sources 13La, 13Lb, and 13Lc has a shape that extends from the lower and outer side with respect to the width direction of the vehicle to the upper and inner side with respect to the width direction of the vehicle. The longer sides of each of the sub headlight light sources 13La, 13Lb, and 13Lc extend along a direction of arrangement of the sub headlight light sources 13La, 13Lb, and 13Lc. The shorter sides of each of the sub headlight light sources 13La, 13Lb, and 13Lc are opposed to each other.

Figure 17F:
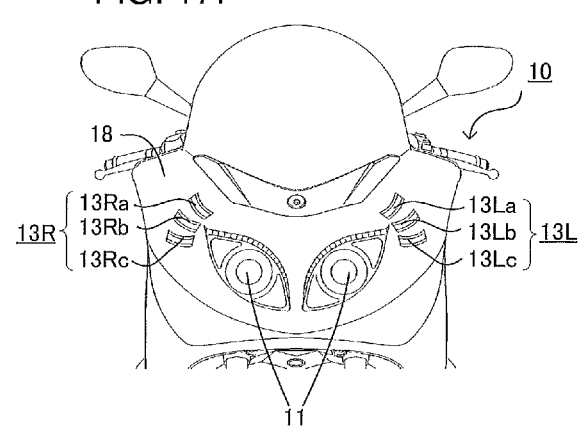

In an example shown in FIG. 17F, the motorcycle 10 preferably includes main headlights 11 of two lamp types. Each of the main headlights 11 is arranged in each of right and left portions on the front surface of the front cover 18.

The sub headlight light sources 13La, 13Lb, and 13Lc preferably are arranged at the upper left side of the main headlight 11, sequentially from the upper and inner side with respect to the width direction of the vehicle to the lower and outer side with respect to the width direction of the vehicle.

Each of the sub headlight light sources 13La, 13Lb, and 13Lc preferably has a shape that extends from the lower and inner side with respect to the width direction of the vehicle to the upper and outer side with respect to the width direction of the vehicle. The shorter sides of each of the sub headlight light sources 13La, 13Lb, and 13Lc extend along a direction of arrangement of the sub headlight light sources 13La, 13Lb, and 13Lc. The longer sides of each of the sub headlight light sources 13La, 13Lb, and 13Lc are opposed to each other.

The arrangements of the sub headlight light sources illustrated in the above-described preferred embodiments are merely non-limiting examples of the present invention. The present invention is not limited to these examples.

In a preferred embodiment of the present invention, as the outer edge of the illumination range of each sub headlight light source, there is preferably adopted an outer edge of the illumination range obtained at a time when the brightness of this sub headlight light source changes as a result of the lean angle of the vehicle reaching the reference value set for this sub headlight light source. More specifically, in FIG. 10, three outer edges $W_1$, $W_2$, and $W_3$ are shown. The outer edge $W_1$ is an outer edge of the illumination range $SH_1$ obtained when the sub headlight light source 13La is turned on. The outer edge $W_2$ is an outer edge of the illumination range $SH_2$ obtained when the sub headlight light source 13Lb is turned on. Thus, the outer edges $W_1$ and $W_2$ are not the outer edge obtained at a time when the sub headlight light source 13Lc is turned on.

In a preferred embodiment of the present invention, as the reference value set for the sub headlight light source is greater, the outer edge of the illumination range obtained at a time when the brightness of this sub headlight light source changes as a result of the lean angle reaching this reference value preferably is located farther outward (inward of the curve, and in other words, toward the side to which the vehicle is inclined with the lean attitude) with respect to the width direction of the vehicle. Therefore, when the sub headlight light sources are sequentially turned on along with an increase in the lean angle, the outer edge of the illumination range is sequentially shifted to the outer side. As a result, illumination can be performed with an illumination range suitable for each of a wide variety of running scenes.

When the sub headlight light source 13Lc for which the greatest reference value is set is turned on, the other sub headlight light sources 13La and 13Lb are also turned on. Accordingly, the illumination range $SH_3$ of the sub headlight light source 13Lc for which the greatest reference value is set preferably includes (overlaps) illumination ranges of the other sub headlight light sources 13La and 13Lb, though not shown. Therefore, it is possible to compare the outer edges of the illumination ranges of the respective sub headlight light sources obtained at a time when the sub headlight light source 13Lc is turned on, but nevertheless, even if such a comparison reveals that, as the reference value is greater, the outer edge of the corresponding illumination range is located farther outward, a result obtained therefrom is different from preferred embodiments of the present invention, as apparent from the above-described functions and effects of preferred embodiments of the present invention.

In the motorcycle 10 according to the present preferred embodiment, the sub headlight 13 preferably includes the sub headlight units 13L and 13R, each of which is provided at each side with respect to the width direction of the vehicle. However, the present invention is not limited to this example. For example, in a possible configuration, the sub headlight units 13L and 13R each provided at each side with respect to the width direction of the vehicle are formed integral with each other, as a single sub headlight unit. In this case, the single sub headlight unit includes, at each side thereof with respect to the width direction of the vehicle, a plurality of headlight light sources that generate illumination ranges at one side with respect to the width direction of the vehicle.

The present preferred embodiment describes a case where each of the sub headlight units 13L and 13R preferably is a physically integrated unit. However, the present invention is not limited to this example. It may be possible that the sub headlight unit 13L is physically divided into the sub headlight light sources 13La to 13Lc. In this case, it may be possible that these sub headlight light sources 13La to 13Lc are assembled into a single sub headlight unit 13L which is then installed in the motorcycle 10 (vehicle). It may be also possible that each of the sub headlight light sources 13La to 13Lc is individually installed in the motorcycle 10. In this case, the sub headlight light sources 13La to 13Lc, in a state of being installed in the motorcycle 10, preferably constitute a single sub headlight unit 13L.

In the present preferred embodiment, the sub headlight units 13L and 13R preferably are members separate from the main headlight 11. However, the present invention is not limited to this example. It may be acceptable that a sub headlight unit is integrated with a main headlight. In this case, the sub headlight unit includes the main headlight.

The attitude detection sensor 22 and the vehicle speed sensor 23 correspond to a detector that detects variables available to obtain the lean angle of the motorcycle 10. Although the detector preferably includes the attitude detection sensor 22 and the vehicle speed sensor 23 in this preferred embodiment, the present invention is not limited to this example. For example, the detector may include the attitude detection sensor 22 while not including the vehicle speed sensor 23. The controller 20 corresponds to a control unit of preferred embodiments of the present invention. However, a hardware configuration of the present invention is not limited to this example. The control unit determines whether or not the lean angle of the motorcycle 10 has reached the reference value based on the variables detected by the detector. At this time, it is not always necessary that the control unit calculates the lean angle. No particular limitation is put on details of processing performed in the control unit. For example, it may be possible that a memory provided in the controller 20 serving as the control unit stores, in the form of data, a table in which the angular velocity (roll rate) and the vehicle speed are associated with a result of whether or not the lean angle has reached a first reference value. In this case, the control unit refers to the table based on the angular velocity and the vehicle speed, and thereby can determine whether or not the lean angle has reached the first reference value without calculating the lean angle.

In the present preferred embodiment, the lean angle preferably is the angle of inclination of the vehicle body to the inner side of a curve relative to the upright state (vertical direction). However, the present invention is not limited to this example. The lean angle may be the angle of inclination of the vehicle body to the inner side of a curve relative to a direction perpendicular to a road surface. As a method and a device for measuring the angle of inclination of the vehicle body to the inner side of a curve relative to the direction perpendicular to the road surface, conventionally known ones are adoptable.

The present preferred embodiment describes a case where the sub headlight units 13L and 13R are members separate from the control unit (controller 20) and the detector (the attitude detection sensor 22 and the vehicle speed sensor 23). However, the present invention is not limited to this example. The sub headlight unit may include at least one of the control unit, the communication unit, and the detector.

In the present preferred embodiment, three sub headlight light sources are preferably provided at each side of the vehicle with respect to the width direction of the vehicle, for example. In the present invention, however, it suffices the number of sub headlight light sources that illuminate one side of the vehicle with respect to the width direction of the vehicle is at least two, for example. Additionally, in the present invention, it suffices that the vehicle includes a plurality of sub headlight light sources that illuminate the left side with respect to the width direction of the vehicle and a plurality of sub headlight light sources that illuminate the right side with respect to the width direction of the vehicle, for example. It is not always necessary that the sub headlight light sources are provided at each side of the vehicle with respect to the width direction of the vehicle. It is preferable that the number of sub headlight light sources that illuminate one side of the vehicle with respect to the width direction of the vehicle is at least three, for example.

In the present preferred embodiment, one sub headlight light source is preferably constituted of one light source, and one reference value is preferably set for this one light source, for example. However, in the present invention, the number of light sources that constitute one sub headlight light source is not particularly limited. For example, it may be acceptable that one sub headlight light source preferably is constituted of a plurality of light sources and one reference value is preferably set for the plurality of light sources, for example.

The present preferred embodiment describes a case where the reference value used when the lean angle increases so that the brightness of the sub headlight light source increases preferably is the same as the reference value used when the lean angle decreases so that the brightness of the sub headlight light source decreases. Instead, these reference values may be different from each other. To be specific, it may be possible that a reference value used when the brightness increases and a reference value used when the brightness decreases are set for one sub headlight light source. In such a case, the reference value used when the brightness increases can be set greater than the reference value used when the brightness decreases. This can prevent frequent occurrence of a change in the brightness, which may otherwise be caused by merely a slight change in the lean angle.

The present preferred embodiment describes a case where the sub headlight light source preferably is turned on in accordance with the lean angle. However, the present invention is not limited to this example. The sub headlight light source may be configured such that a turn-on function in accordance with the lean angle is manually activated or deactivated. To be specific, it may be possible that the function is manually put into a standby state and, in the standby state, the sub headlight light source is turned on in accordance with the lean angle. In this case as well, the sub headlight light source is turned on not manually but in accordance with the lean angle. In the flasher, on the other hand, flashing/turn-off is manually switched. Also, in the main headlight, the illuminating direction is manually switched. In this manner, the sub headlight light source is different from the flasher and the main headlight.

The sub headlight light source may be also configured such that an instruction for turn-on or turn-off is manually inputted. In such a case, when the instruction is not inputted, the brightness of the sub headlight light source is changed in accordance with the lean angle, while when the instruction is inputted, turn-on or turn-off is performed in accordance with the instruction. For example, when the instruction for turn-on is inputted, the sub headlight light source is turned on irrespective of the lean angle. When the instruction for turn-off is inputted, the sub headlight light source is turned off irrespective of the lean angle. In such a case, the sub headlight system includes an input device (for example, a switch) to which the instruction to turn on or off the sub headlight light source is manually inputted. When the instruction is inputted, the control unit turns on or off the sub headlight light source in accordance with the instruction. When the instruction is not inputted, the control unit changes the brightness of the sub headlight light source in accordance with the lean angle. In this case as well, the sub headlight light source is different from the flasher and the main headlight, in that a function of turning on the sub headlight light source in accordance with the lean angle is provided.

The sub headlight light source may be configured such that, when the lean angle is equal to or larger than a minimum reference value, the brightness is changed in accordance with the lean angle, while when the lean angle is less than the minimum reference value (for example, at a time of running straight ahead), the brightness is manually changed. In this case as well, the sub headlight light source is different from the flasher and the main headlight, in that a function of turning on the sub headlight light source in accordance with the lean angle is provided.

In a preferred embodiment of the present invention, turn-on of the sub headlight light source includes turn-on in a full light state and turn-on in a dimmed state. No particular limitation is put on a method for dimming the sub headlight light source. The sub headlight light source configured of an LED, for example, can be turned on in a dimmed state by a dimming control using a pulse width modulation control (PWM control). In this case, a situation where the sub headlight light source reaches the predetermined brightness in accordance with the lean angle may include a situation where the duty cycle of the sub headlight light source continuously or gradually changes from zero to a value greater than zero in accordance with the lean angle.

In the description of this preferred embodiment, the sub headlight light source is turned on in accordance with the lean angle. Here, the sub headlight light source is turned on in accordance with the lean angle because the sub headlight light source functions mainly as a light for ensuring the field of view of the rider of the vehicle. Therefore, in a well-lit situation, for example, in daytime, the sub headlight light source may not necessarily be turned on in accordance with the lean angle.

The present preferred embodiment describes a case where a greater reference value ($K_1$ to $K_3$) preferably has a smaller interval ($K_1$, $K_2'$, $K_3'$). However, the present invention is not limited to this example. In the present preferred embodiment, as the reference values $K_1$ to $K_3$ of the sub headlight light sources 13La to 13Lc are greater, the outer edges $W_1$, $W_2$, and $W_3$ of the illumination ranges $SH_1$, $SH_2$, and $SH_3$ of the sub headlight light sources 13La to 13Lc having the illuminance $L_1$ are located farther outward with respect to the width direction Y of the motorcycle 10 in a plan view. This enables illumination to be performed with an illumination range suitable for each of a wide variety of running scenes, with suppression of a size increase.

In a preferred embodiment of the present invention, the following configurations are adoptable.

A sub headlight unit for use in a vehicle that leans into turns includes a plurality of sub headlight light sources provided at one side with respect to a width direction of the vehicle, the plurality of sub headlight light sources being arranged to illuminate, at the one side, an area ahead and outward of the vehicle with respect to the width direction of the vehicle, wherein the brightness of the sub headlight light source changes in accordance with a lean angle of the vehicle, when the lean angle of the vehicle reaches a reference value that is individually set for each of the sub headlight light sources, the sub headlight light source exhibits a predetermined brightness, and when the vehicle is in an upright state, the sub headlight light source having a greater reference value is located at the outer side of the sub headlight light source having a smaller reference value with respect to the width direction of the vehicle.

When the vehicle moves through a curve, the rider is more likely to see a position or area farther into the curve (farther outward with respect to the width direction of the vehicle) in accordance with an increase in the lean angle of the vehicle. In this configuration, as the lean angle increases, the sub headlight light source located farther outward is turned on. This makes it easy to ensure a wide illumination range in an area lateral to the vehicle, and thereby a position the rider desires to see is likely to be illuminated.

In the sub headlight unit described above, when the vehicle is in an upright state, the sub headlight light source having a greater reference value preferably is located higher than the sub headlight light source having a smaller reference value.

In the configuration described above, by placing the sub headlight light source having a greater reference value in a higher position, a difference in the height among the sub headlight light sources at times when they are turned on is made small. As a result, a difference among the illumination ranges generated on a road surface at times when the sub headlight light sources are turned on is made small. Therefore, when seen from the rider, a difference among shadows, which are produced when an obstacle (such as unevenness on the road surface) exists, is made small. This can perform illumination more suitable for each of a wide variety of running scenes.

In the sub headlight unit described above, when the vehicle is in an upright state, the sub headlight light source having a greater reference value is preferably located lower than the sub headlight light source having a smaller reference value.

In the configuration described above, the sub headlight light source having a smaller reference value preferably is located at a relatively high position at a time when this sub headlight light source is turned on. Thus, a relatively wide illumination range is ensured as the illumination range of the sub headlight light source having a smaller reference value. Additionally, since the sub headlight light source is turned on at a relatively high position, it is easy to set an illumination range on the road surface. It is also easy for the rider to visually recognize an obstacle (such as unevenness on the road surface) and an area behind the obstacle. This enables the sub headlight light sources to perform illumination more suitable for a wide variety of running scenes.

In the sub headlight unit described above, when the vehicle is in an upright state, the plurality of sub headlight light sources are preferably arranged in a horizontal direction.

In the configuration described above, a difference in the height among the sub headlight light sources at times when they are turned on is made further smaller. This can more effectively prevent occurrence of a situation where the rider feels uncomfortable due to a change, which depends on a running scene, in the illumination range of the sub headlight light source within the rider's field of view at a time when the sub headlight light source is turned on. This enables the sub headlight light sources to perform illumination more suitable for a wide variety of running scenes.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sub headlight unit for use in a vehicle that leans into turns, the sub headlight unit comprising:
    a plurality of sub headlight light sources arranged to illuminate, at one side with respect to a width direction of the vehicle, an area ahead and outward of the vehicle with respect to the width direction of the vehicle; wherein
    a brightness of the sub headlight light source changes in accordance with a lean angle of the vehicle;
    when the lean angle of the vehicle reaches a reference value that is individually set for each of the sub headlight light sources, the sub headlight light source exhibits a predetermined brightness; and
    as the reference value set for the sub headlight light source is greater, an outer edge of an illumination range of the sub headlight light source having a predetermined illuminance is located farther outward with respect to the width direction of the vehicle in a plan view.

2. The sub headlight unit according to claim 1, wherein as the reference value set for the sub headlight light source is greater, an outer edge of an illumination range of the sub headlight light source having a predetermined illuminance obtained when the vehicle is in an upright state is located farther outward with respect to the width direction of the vehicle.

3. The sub headlight unit according to claim 1, wherein as the reference value set for the sub headlight light source is greater, a larger angle is defined in the plan view between an optical axis of the sub headlight light source and a center line of the vehicle in a front-back direction thereof.

4. The sub headlight unit according to claim 1, wherein the plurality of sub headlight light sources are located at the one side of the vehicle with respect to the width direction of the vehicle, and, as the reference value set for the sub headlight light source is greater, an outer edge of an illumination range having a predetermined illuminance generated at the one side by the sub headlight light source among the plurality of sub headlight light sources is located farther outward with respect to the width direction of the vehicle.

5. The sub headlight unit according to claim 1, wherein
    as the reference value set for the sub headlight light source is greater, an illumination range of the sub headlight light source obtained when the vehicle is in an upright state is located higher; and
    as the illumination range of the sub headlight light source is located higher, an outer edge of an illumination range having a predetermined illuminance generated by the sub headlight light source among the plurality of sub headlight light sources is located farther outward with respect to the width direction of the vehicle.

6. The sub headlight unit according to claim 1, wherein an optical axis of the sub headlight light source is fixed, and as the reference value set for the sub headlight light source is greater, an outer edge of an illumination range having a predetermined illuminance generated by the sub headlight light source among the plurality of sub headlight light sources whose optical axes are fixed is located farther outward with respect to the width direction of the vehicle.

7. The sub headlight unit according to claim 1, wherein as the reference value set for the sub headlight light source is greater, a cut-off line of the sub headlight light source is inclined at a larger inclination angle relative to a horizontal line that is obtained when the vehicle in an upright state is seen from a front side thereof.

8. The sub headlight unit according to claim 1, wherein when
    the lean angle of the vehicle reaches a reference value that is individually set for each of the sub headlight light sources, the sub headlight light source is turned on; and
    as the reference value set for the sub headlight light source is greater, an outer edge of an illumination range having a predetermined illuminance generated by the sub headlight light source at a time when the sub headlight light source is turned on is located farther outward with respect to the width direction of the vehicle.

9. The sub headlight unit according to claim 1, wherein
    when the lean angle of the vehicle reaches a reference value that is individually set for each of the sub headlight light sources, the sub headlight light source is turned on in a full light state; and
    as the reference value set for the sub headlight light source is greater, an outer edge of an illumination range having a predetermined illuminance generated by the sub headlight light source at a time when the sub headlight light source is turned on in the full light state is located farther outward with respect to the width direction of the vehicle.

10. The sub headlight unit according to claim 1, wherein the sub headlight units are provided at the one side of the vehicle, and when the vehicle is in an upright state, the sub headlight light source having a greater reference value is located at the outer side of the sub headlight light source having a smaller reference value with respect to the width direction of the vehicle.

11. The sub headlight unit according to claim 10, wherein when the vehicle is in an upright state, the sub headlight light source having a greater reference value is located higher than the sub headlight light source having a smaller reference value.

12. The sub headlight unit according to claim 10, wherein when the vehicle is in an upright state, the sub headlight light source having a greater reference value is located lower than the sub headlight light source having a smaller reference value.

13. The sub headlight unit according to claim 10, wherein the plurality of sub headlight light sources are arranged adjacent to one another, and when the vehicle is in an upright state, the positions of the sub headlight light sources that are adjacent to one another are partially coincident with respect to a height direction.

14. The sub headlight unit according to claim 10, wherein when the vehicle is in an upright state, the plurality of sub headlight light sources are arranged in a horizontal direction.

15. The sub headlight unit according to claim 10, wherein a front cover included in the vehicle includes a curved surface that is outwardly convex and extends from a front center portion with respect to the width direction of the vehicle in a direction rearward and outward with respect to the width direction of the vehicle, and the plurality of sub headlight light sources are arranged along the curved surface of the front cover.

16. The sub headlight unit according to claim 10, wherein when the vehicle is in an upright state, the sub headlight light source located outermost is located above a main headlight provided in the vehicle, the main headlight being configured to illuminate an area ahead in front of the vehicle.

17. A sub headlight system for use in a vehicle that leans into turns, the sub headlight system comprising:
   the sub headlight unit according to claim 1;
   a controller arranged and programmed to change the brightnesses of the plurality of sub headlight light sources in accordance with the lean angle of the vehicle; and
   a detector that detects a variable that obtains the lean angle of the vehicle; wherein
   when the lean angle of the vehicle reaches a reference value that is individually set for each of the sub headlight light sources, the controller causes the corresponding sub headlight light source to exhibit a predetermined brightness.

18. A vehicle that leans into turns comprising:
the sub headlight system according to claim 17.

* * * * *